United States Patent

Miyabayashi

[11] Patent Number: 5,354,612
[45] Date of Patent: Oct. 11, 1994

[54] REVOLUTION BODY HAVING AN ELASTIC LAYER OF DIMETHYLSILICONE RUBBER FORMED FROM POLYSILOXANE AND SILICIC ACID FINE POWDER

[75] Inventor: Toshiyuki Miyabayashi, Ohmachi, Japan

[73] Assignee: Canon Kabushiki Kaisha, Tokyo, Japan

[21] Appl. No.: 380,639

[22] Filed: Jul. 17, 1989

[30] Foreign Application Priority Data

Jul. 19, 1988 [JP] Japan .................. 63-181158
Jul. 19, 1988 [JP] Japan .................. 63-181160

[51] Int. Cl.⁵ .................. B32B 25/20; C08G 77/00
[52] U.S. Cl. .................. 428/331; 118/60; 355/290; 428/36.8; 428/36.9; 428/405; 428/446; 428/447; 430/99; 523/212
[58] Field of Search .................. 428/447, 446, 331, 339, 428/368, 36.9, 405; 29/132; 118/60; 523/212; 355/290; 430/99

[56] References Cited

U.S. PATENT DOCUMENTS

| | | | |
|---|---|---|---|
| 4,032,502 | 6/1977 | Lee et al. | 260/37 |
| 4,108,825 | 8/1978 | Hayes | 523/212 |
| 4,196,273 | 4/1980 | Imai et al. | 528/15 |
| 4,360,610 | 11/1982 | Murray et al. | 523/212 |
| 4,454,288 | 6/1984 | Lee et al. | 524/588 |
| 4,500,659 | 2/1985 | Kroupa et al. | 523/213 |
| 4,711,818 | 12/1987 | Henry | 428/447 |
| 4,777,087 | 10/1988 | Heeks et al. | 29/132 |
| 4,985,477 | 1/1991 | Collins et al. | 523/212 |

FOREIGN PATENT DOCUMENTS 0062408 10/1982 European Pat. Off. .
0280437 8/1988 European Pat. Off. .
60-166975 8/1985 Japan .

Primary Examiner—D. S. Nakarani
Attorney, Agent, or Firm—Fitzpatrick, Cella Harper & Scinto

[57] ABSTRACT

An addition reaction-type dimethylsilicone composition, including a diorganopolysiloxane containing a reactive vinyl group; an organopolysiloxane containing an active hydrogen atom; and silicic acid fine powder of which surface has been treated with a fluoroalkylsilane, an alkylsilane compound, a fluorosilicone oil, a dimethylsilicone oil, or a mixture thereof, and a silane compound containing an unsaturated group having a reactivity to the organopolysiloxane containing an active hydrogen atom.

34 Claims, 5 Drawing Sheets

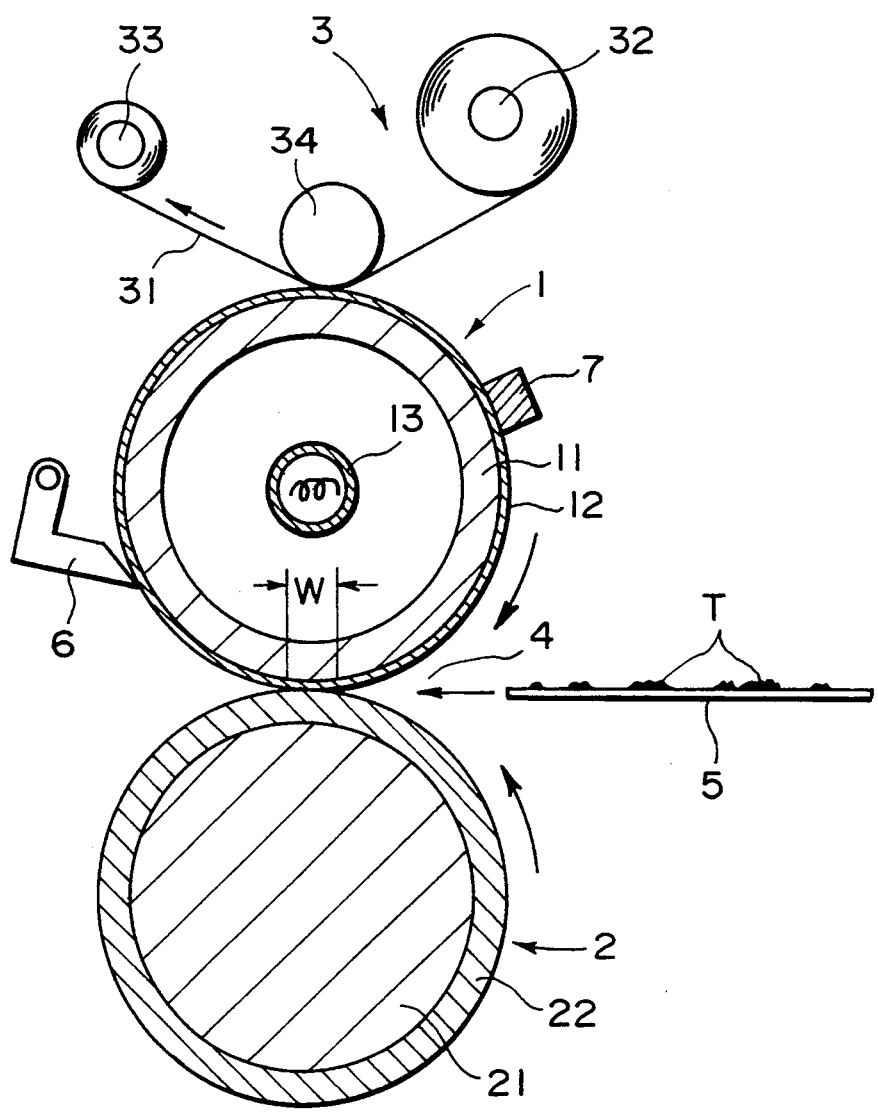
F I G. 4

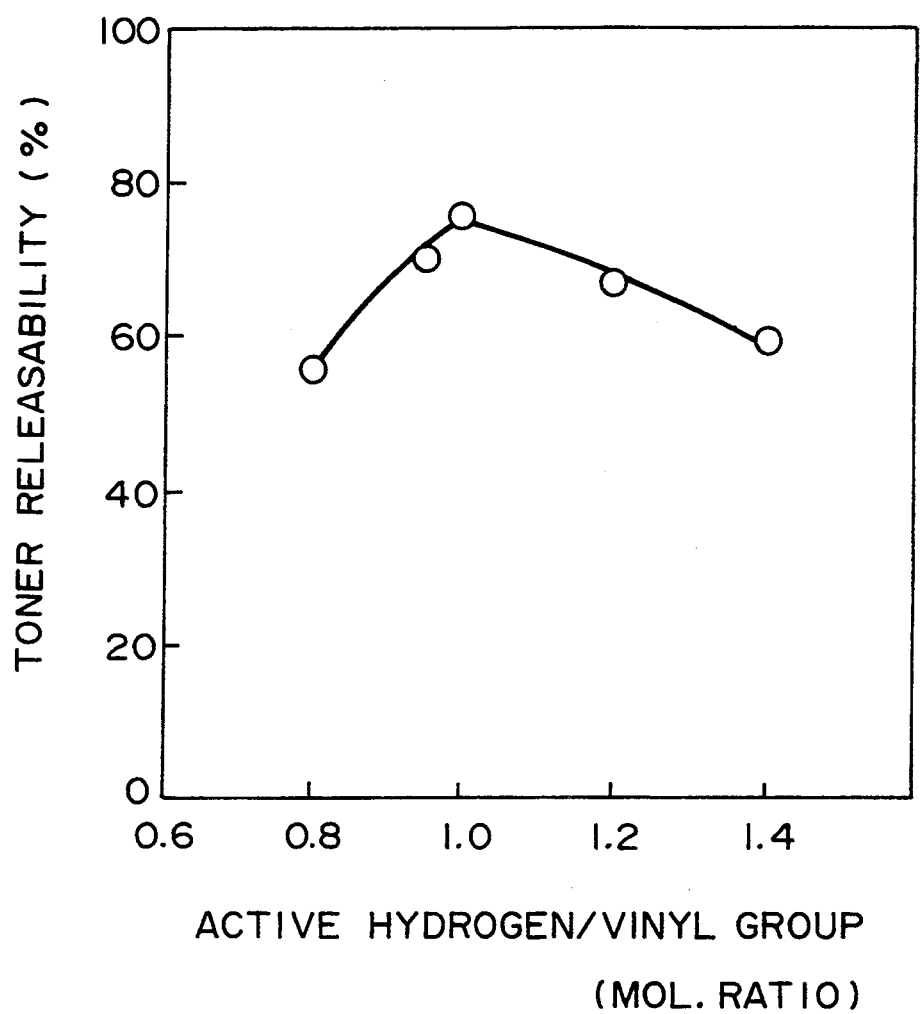
F I G. 7

5,354,612

REVOLUTION BODY HAVING AN ELASTIC LAYER OF DIMETHYLSILICONE RUBBER FORMED FROM POLYSILOXANE AND SILICIC ACID FINE POWDER

FIELD OF THE INVENTION AND RELATED ARTS

The present invention relates to an addition reaction-type dimethylsilicone composition containing silicic acid fine powder surface-treated with a fluoroalkylsilane, an alkylsilane compound, fluorosilicone oil, dimethylsilicone oil or a mixture thereof, and a silane compound including an unsaturated group having a reactivity with an addition reaction-type silicone; a dimethylsilicone rubber composition formed from the silicone composition; an elastic revolution body (or body of revolution) including an elastic body having a surface layer formed from the dimethylsilicone rubber composition; and a fixing device including the elastic revolution body. The silicone rubber composition according to the present invention is particularly suitable for an elastic coating material of an elastic revolution body which is used for a conveyor roller for conveying a sheet transfer material (or recording material) or a fixing roller in an image forming apparatus such as electrophotographic copying machine and printer.

In an image forming apparatus such as electrophotographic copying machine, conveying ability, releasability and durability are generally required for the conveyer roller for conveying a sheet transfer material (or recording material) in the form of a sheet such as plain paper along a prescribed conveying path. Further, conveying ability, releasability, abrasion resistance, fixing characteristics and durability are also required under more severe conditions with respect to a fixing device comprising a fixing roller and a pressure roller, which applies heat to an unfixed toner image formed on a transfer paper under pressure, and must convey the transfer paper to the prescribed conveying path while preventing an offset phenomenon due to sintering or melted toner.

Conventionally, the fixing device of this type comprises at least a fixing roller and a pressure roller which contacts the fixing roller under pressure and rotates corresponding to the rotation thereof. The fixing roller comprises a hollow core bar (or cylinder) formed of a metal such as aluminum and iron, and a layer of a material having good releasability such as silicone rubber and fluorine-containing resin including polytetrafluoroethylene, tetrafluoroethylenefluoroalkoxyethylene copolymer, etc., which covers the core bar. Inside the fixing roller, a heater such as halogen lamp is disposed as desired, thereby to elevate the surface temperature of the fixing roller to a temperature suitable for the fixing. In many cases, the above-mentioned surface temperature of the fixing roller is controlled by means of a sensor so that it is set to a prescribed temperature. Further, around the peripheral surface of the fixing roller, there is sometimes disposed a cleaner for removing the offset toner and paper dust, or a separation claw for preventing a transfer material or image-carrying material from winding about the fixing roller.

On the other hand, the pressure roller comprises a core bar formed of a metal such as iron and stainless steel, and an elastic layer having releasability and comprising a material such as silicone rubber, which covers the core bar. The pressure roller is caused to contact the fixing roller under pressure by a pressure-applying means such as a spring.

The image-supporting material carrying thereon an unfixed toner image is sandwiched between and conveyed by the above-mentioned fixing roller and pressure roller under pressure, whereby the unfixed toner image is fixed to the image-carrying material under pressure, or under heating and pressure. However, when the conventional dimethylsilicone rubber is used for the layer covering the core bar of a fixing roller, the fixing roller covered with the silicone rubber is capable of providing good fixability of an unfixed toner image to an image-carrying material such as plain paper and good image quality of the resultant fixed image (e.g., capable of providing a fixed image having a reduced gloss), but has a problem such that it is inferior to a fixing roller covered with a fluorine-containing resin in releasability and durability.

Image forming apparatus such as electrophotographic copying machine tend to employ the fixing roller covered with a silicone rubber which is inferior to that covered with a fluorine-containing resin in releasability and durability but is capable of providing an excellent image quality of a fixed image because the latter is more important to the above-mentioned image forming apparatus. Accordingly, the releasability and durability of a silicone rubber material has been desired to be improved.

For example, it is known that silicic acid such as synthetic hydrous silicic acid and synthetic anhydrous silicic acid is added to a silicone rubber material as a reinforcement in order to improve the durability. However, in the case of the synthetic hydrous silicic acid, the reinforcement effect thereof is not substantially achieved unless it is added to a silicone rubber material in a considerable large amount of 20–50 wt. parts per 100 wt. parts of the silicone rubber material. Further, such addition causes a problem such that the releasability of the silicone rubber material is considerably decreased.

In the case of the synthetic anhydrous silicic acid, a lesser reinforcement effect can be achieved when it is added to a silicone rubber material in a smaller amount (e.g., 10–20 wt. parts per 100 wt. parts of the silicone rubber material) than that in the case of the synthetic hydrous silicic acid, but the releasability is also decreased considerably. Accordingly, in either case, it has been difficult to remarkably improve the durability of a silicone rubber material without decreasing the releasability thereof.

SUMMARY OF THE INVENTION

An object of the present invention is to provide an addition reaction-type dimethylsilicone composition and an addition reaction-type dimethylsilicone rubber composition which are excellent in mechanical strength and have good releasability.

Another object of the present invention is to provide an elastic revolution body which is excellent in mechanical strength and has good releasability.

A further object of the present invention is to provide an elastic revolution body which has excellent in durability.

A still further object of the present invention is to provide fixing device which is excellent in durability.

I have earnestly researched on a silicone rubber composition excellent in both releasability and durability which may be used as a coating material for an elastic revolution body for conveying a sheet transfer material or recording material such as plain paper and fixing an unfixed toner image to form a fixed image, in an image forming apparatus such as electrophotographic copying machine and printer. On the basis of such study, I have found that a silicone rubber composition having a good balance between reinforcement and releasability can be obtained by incorporating, in an addition reaction-type dimethylsilicone compound, silicic acid which has been surface-treated with (or modified by) a fluoroalkylsilane, an alkylsilane compound, fluorosilicone, dimethylsilicone oil or a mixture thereof, and a silane compound including a functional group having a reactivity; and the durability of a fixing roller is remarkably improved by using the above-mentioned silicone rubber composition as a coating layer thereof.

The addition reaction-type dimethylsilicone composition according to the present invention is based on the above discovery and comprises: a diorganopolysiloxane containing a reactive vinyl group; an organopolysiloxane containing an active hydrogen atom; and silicic acid fine powder of which surface has been treated with a fluoroalkylsilane, an alkylsilane compound, a fluorosilicone oil, a dimethylsilicone oil, or a mixture thereof, and a silane compound containing an unsaturated group having a reactivity to the organopolysiloxane containing an active hydrogen atom.

The present invention also provides a dimethylsilicone rubber composition obtained by heating a platinum-type catalyst; and an addition reaction-type dimethylsilicone composition comprising: a diorganopolysiloxane containing a reactive vinyl group, an organopolysiloxane containing an active hydrogen atom, and silicic acid fine powder of which surface has been treated with a fluoroalkylsilane, an alkylsilane compound, a fluorosilicone oil, a dimethylsilicone oil, or a mixture thereof, and a silane compound containing an unsaturated group having a reactivity to the organopolysiloxane containing an active hydrogen atom.

The present invention also provides an elastic revolution body comprising an elastic layer formed from a dimethylsilicone rubber composition; the dimethylsilicone rubber composition being obtained by heating a platinum-type catalyst and an addition reaction-type dimethylsilicone composition comprising: a diorganopolysiloxane containing a reactive vinyl group; an organopolysiloxane containing an active hydrogen atom; and silicic acid fine powder of which surface has been treated with a fluoroalkylsilane, an alkylsilane compound, a fluorosilicone oil, a dimethylsilicone oil, or a mixture thereof, and a silane compound containing an unsaturated group having a reactivity to the organopolysiloxane containing an active hydrogen atom.

The present invention further provides a fixing device, comprising at least a pair of rollers between which a toner image-supporting material carrying an unfixed toner image is passed under pressure to fix the toner image to the toner image-supporting material; wherein at least one of the pair of rollers comprises an elastic layer formed from a dimethylsilicone rubber composition; the dimethylsilicone rubber composition being obtained by heating a platinum-type catalyst and an addition reaction-type dimethylsilicone composition comprising: a diorganopolysiloxane containing a reactive vinyl group, an organopolysiloxane containing an active hydrogen atom, and silicic acid fine powder of which surface has been treated with a fluoroalkylsilane, an alkylsilane compound, a fluorosilicone oil, a dimethylsilicone oil, or a mixture thereof, and a silane compound containing an unsaturated group having a reactivity to the organopolysiloxane containing an active hydrogen atom.

In the present invention, "silicic acid" means one which is solid at normal or room temperature and also includes a silicic acid compound such as orthosilicic acid.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 is a schematic sectional view showing a hot roller-type fixing device for fixing a toner image according to the present invention; and FIGS. 5 to 7 are graphs showing relationships between the mol.ratio of (active hydrogen)/(vinyl group) and hardness, impact resilience and toner releasability of the silicone rubber composition obtained in Example 9 appearing hereinafter.

DETAILED DESCRIPTION OF THE INVENTION

Figure 1:
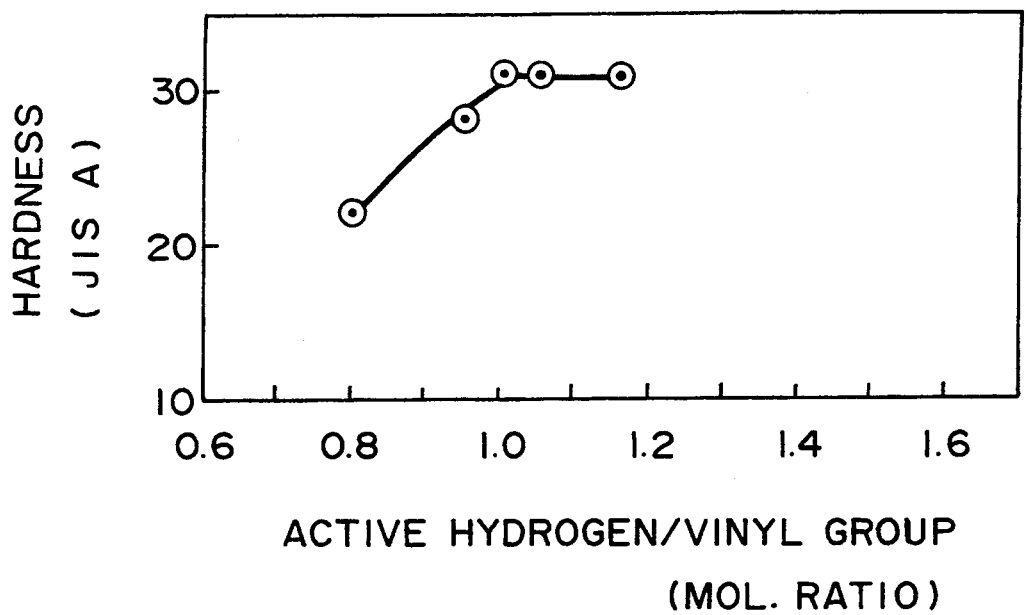
FIGS. 1 to 3 are graphs showing relationships between the mol.ratio of (active hydrogen)/(vinyl group) and hardness, impact resilience and toner releasability of the silicone rubber composition obtained in Example 3 appearing hereinafter.

The addition reaction-type dimethylsilicone composition according to the present invention comprises, at least, a component (I), a component (II) and a component (IV) as described below, and may further comprises a component (III) as described below.

Examples of the organopolysiloxane component (I) containing a reactive vinyl group may include:

an organopolysiloxane such as a reactive vinyl group-containing dimethylpolysiloxane having a vinyl group at the end thereof, which is represented by the following general formula:

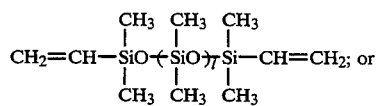

a diorganopolysiloxane such as a reactive vinyl group-containing dimethylpolysiloxane having a methyl group at the end thereof and having a vinyl group in the side chain thereof, which is represented by the following general formula:

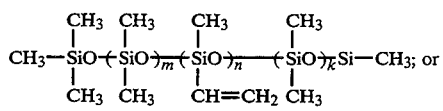

wherein m and k respectively denote 0 or a positive integer, (m+k) may preferably be 50–2,000, and n may preferably be an integer of 1–10; or a vinyl group-containing dimethylpolysiloxane comprising two or more species of the above-mentioned polysiloxane, and l may preferably be 50–2,000.

The component (I) may preferably have a viscosity of 500–5×10⁶ centistoke at room temperature.

In the above formulas, l, m and n respectively denote a positive integer.

Another example of the component (I) may include an organopolysiloxane copolymer (a) which includes an organosiloxane unit represented by

and a fluoroalkyl group-containing organosiloxane unit represented by

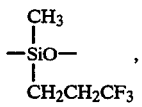

and has a vinyl group at the end of its molecular chain. $R_1$ and $R_2$ used herein respectively denote an alkyl group (preferably having 1-3 carbon atoms) such as methyl, ethyl, and propyl. The organopolysiloxane copolymer (a) may preferably contain the $CF_3CH_2CH_2(CH_3)SiO$— unit in an amount of 10–60 mol. %, more preferably 20–40 mol. %.

The active hydrogen-containing organopolysiloxane component (II) may for example be a methylhydrogenpolysiloxane represented by the following general formulas:

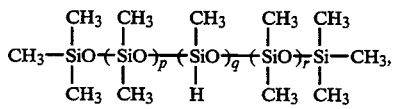

wherein p denotes 0 or a positive integer, and q denotes a positive integer. (p+q) may preferably be 50–500, and q may preferably be an integer of 1–10. This organopolysiloxane, contains at least one active hydrogen atom connected (or bonded) to a silicon atom (—Si—H) per unit molecule.

Another example of the component (II) may be one which includes at least one hydrogen atom connected to a silicon atom, on the average, per one molecule, and includes an organosiloxane unit represented by

and an organosiloxane unit represented by

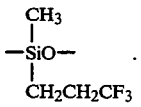

$R_3$ and $R_4$ used herein respectively denote an alkyl group (preferably having 1-3 carbon atoms) such as methyl, ethyl, and propyl.

Such a component (II) may for example have the following formula:

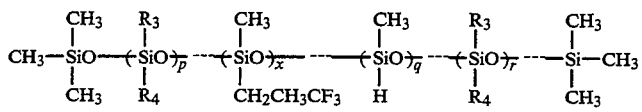

The component (III) used in the present invention is a platinum-type catalyst such as platinum and a platinum compound. The platinum-type catalyst component (III) is one which is effective in catalyzing a reaction between an active hydrogen connected to a silicon atom, and a vinyl group. An optimum addition amount of the catalyst may be determined in consideration of a length of pot-life, but may preferably be 100–5,000 ppm.

Specific examples of the surface-treated silicic acid fine powder component (IV) may include surface-modified silicic acid fine powder obtained by treating the surface of silicic acid such as synthetic anhydrous silicic acid fine powder and synthetic hydrous silicic acid fine powder, with fluoroalkylsilane, an alkylsilane compound, fluorosilicone oil, dimethylsilicone oil, or a mixture thereof, and a silane compound having an unsaturated group which has a reactivity to an active hydrogen-containing organopolysiloxane.

The addition reaction-type dimethylsilicone rubber composition according to the present invention is a hardenable (or curable) composition comprising a homogeneous mixture of the above-mentioned silicone composition. Each of the components (I), (II) and (III) per se constituting the composition may be one which is known as that constituting a liquid addition reaction-type dimethylsilicone composition. The vinyl group connected to a silicon atom in the component (I) (—Si—CH=CH₂ group) and the hydrogen atom connected to a silicon atom in the component (II) (—Si—H group) initiate an addition reaction when they are heated in the presence of the platinum-type catalyst (ordinarily, at a temperature of 100°–180° C. for 0.5 to 20 min.), whereby the silicone composition becomes a silicone rubber composition, i.e., a rubber-like elastic material.

In the present invention, the unsaturated group of the treated silicic acid fine powder (IV) constituting the composition according to the present invention reacts with the hydrogen atom connected to a silicon atom of the component (II) and forms a chemical bond. As a result, a desired mechanical strength, which has not been obtained in the prior art until a large amount of synthetic silicic acid is used, may be obtained by adding a relatively small amount of the component (IV). Further, the increase in the surface energy due to the addition of a large amount of filler such as synthetic silicic acid can be prevented or suppressed.

Specific examples of the silicic acid fine powder used in the present invention may include: white ultra-fine powder (or superfines) commonly called "white carbon", such as anhydrous silicic acid ($SiO_2.nH_2O$; $SiO_2$ content=95% or higher), hydrous silicic acid ($SiO_2.nH_2O$; $SiO_2$ content=80–95%), hydrous calcium silicate ($xSiO_2.CaO.yH_2O$, $SiO_2$ content=55–70%), and hydrous aluminum silicate ($xSiO_2.Al_2O_3.yH_2O$; $SiO_2$ content=60–70%).

In the present invention, silicic acid fine powder having a primary particle size of 7-100 mµ (milli-micron), and a BET specific surface area of 40-500 m²/g may preferably be used. Further, as the silicic acid fine powder, hydrous silicic acid or anhydrous silicic acid having a primary particle size of 5-50 mµ (more preferably 7-25 mµ) and a BET specific surface area of 70-400 m²/g (more preferably 100-300 m²/g) may more preferably be used.

Specific examples of the surface-treating agent may include: fluoroalkylsilanes represented by $C_nF_{2n+1}CH_2CH_2SiR_m(OR')_{3-m}$, or $C_nF_{2n+1}CH_2CH_2SiR_mCl_{3-m}$ wherein n denotes an integer of 1-8, m denotes 0 or 1, and R and R' respectively denote methyl or ethyl group; alkylsilanes such as trimethylmethoxysilane, trimethylethoxysilane, dimethyldimethoxysilane, dimethyldiethoxysilane, methyltrimethoxysilane, methyltriethoxysilane, trimethylchlorosilane, dimethyldichlorosilane, methyltrichlorosilane, and hexamethyldisilazane; fluorosilicone oil; and dimethylsilicone oil. Further, specific examples of a reactive unsaturated group-containing silane may include: vinylsilanes such as vinyltriethoxysilane, dimethylvinylmethoxysilane, dimethylvinylethoxysilane, methylvinyldimethoxysilane, methylvinyldiethoxysilane, vinyltrichlorosilane, dimethylvinylchlorosilane, and methylvinyldichlorosilane; and silane compounds having a methacryloxypropyl group such as γ-metharyloxypropyltrimethoxysilane, and γ-methacryloxypropylmethyldimethoxysilane. The surface of the silicic acid fine powder may be treated with the above-mentioned treating agent in a known treating process.

In order to enhance the releasability and the wettability with the components (I) and (II), a treating agent comprising fluoroalkylsilane, alkylsilane, fluorosilicone oil, or dimethylsilicone oil or a mixture thereof may preferably be used for treatment in an amount of 1-30 wt. parts, more preferably 3-25 wt. parts, per 100 wt. parts of silicic acid fine powder. When the fluoroalkylsilane, or alkylsilane is used, in view of the specific surface area, 30-90%, more preferably 40-80% of the surface area of the silicic acid fine powder may preferably be covered with the treating agent. In other words, when the amount of total silanol groups present at the surface of the silicic acid fine powder is represented by 100%, 30-90% (or 40-80%) of the silanol groups

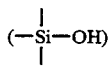

may preferably react with the silane compound.

In view of the reinforcement of the silicone rubber composition, 100 wt. parts of silicic acid fine powder may preferably be coated with 1-30 wt. parts, more preferably 5-25 wt. parts of an unsaturated group-containing silane. In view of the specific surface area, 10-60% (more preferably 20-60%, particularly preferably 30-50%) of the surface area of the silicic acid fine powder may preferably be covered with the treating agent.

In view of both releasability and reinforcement, the surface-treated synthetic silicic acid fine powder may preferably added in an amount of 5-30 wt. parts, more preferably 5-20 wt. parts particularly, 6-15 wt. parts per 100 wt. parts of the components (I), (II) and (III) in total.

When a considerable amount of unreacted reactive groups remain in the cured product, they may impair the releasability. Accordingly, the mol ratio of (hydrogen atom connected to silicon atom)/(unsaturated group) may preferably be adjusted to 0.6-1.5, more preferably 0.8-1.2, before the reaction. When the above-mentioned mol ratio is about 1.0 (e.g., 0.95-1.05), i.e., these numbers of moles are substantially equal to each other, the mechanical strength, hardness, impact resilience and releasability become particularly good.

The composition according to the present invention may further contain a colorant, a heat-resistance improver, a permanent compression set-improver, and/or a thixotropic agent.

The silicone rubber composition according to the present invention shows much better releasability and durability as compared with the conventional silicone rubber material which has been used as a coating material for a heat fixing roller in an electrophotographic copying machine. The reason for this is not necessarily clear, but may be considered that, since an unreacted component does not substantially remain in the cured silicone rubber product, the mechanical strength and viscoelasticity characteristic are improved, the surface energy increase of the cured product is prevented or suppressed, and further the adsorption of a toner to the cured product surface, which may be attributable to the presence of the unreacted component, is obviated. However, such an explanation should not limit the present invention at all.

A fluorosilicone rubber mainly formed from an organopolysiloxane containing a fluorine atom and a reactive vinyl group, and/or an organopolysiloxane containing a fluorine atom and an active hydrogen atom (i.e., a hydrogen atom connected to a Si atom), has a lower surface energy than that of dimethylsilicone rubber, whereby the releasability is further improved. Ordinarily, for the purpose of reinforcement, 5-30 wt. parts of silicic acid fine powder may be added to 100 wt. parts of silicone rubber, but the releasability decreases as the addition amount of the silicic acid increases. However, in the silicic acid fine powder used in the present invention of which surface has been modified by a reactive group-containing treating agent, the surface of the fine powder has been treated with a low-surface energy material such as fluoroalkylsilane, alkylsilane, fluorosilicone oil, and dimethylsilicone oil, whereby the surface energy increase in the silicone rubber composition may be suppressed. Further, since the silicic acid fine powder is treated with an unsaturated group-containing silane, a reactive group is introduced into the surface of synthetic silicic acid, and the reactive group may react with a hydrogen atom connected to a silicon atom of the component (II) (e.g., to cause a crosslinking reaction), whereby the mechanical strength may be enhanced simultaneously.

Accordingly, the silicone rubber composition according to the present invention may provide a coating material for a roller for heating and pressure fixing to be used in an electrophotographic copying machine, etc., which is excellent in releasability, strength and durability.

The composition according to the present invention may be prepared by simply mixing the respective components. However, in a preferred embodiment of the present invention, an A-liquid comprising the components (I), (III) and (IV), and a B-liquid comprising the components (II) and (IV); or an A-liquid comprising the components (I), (III) and (IV), and B-liquid comprising the components (I), (II) and (IV) are separately prepared, and the two components of the thus prepared A-liquid and B-liquid are mixed at a prescribed mixing ratio when the resultant composition is converted into a cured product. Such an embodiment is most advantageous in view of convenience. In such an embodiment, the three components of the unsaturated group-containing component, —Si—H group-containing component, and platinum-type catalyst must not be included in the same package, in order to prevent a reaction from gradually progressing at room temperature.

In the present invention, it is preferred to regulate the amounts of the components (I), (II) and (IV) to be mixed so that the total amount of the unsaturated groups contained in the components (I) and (IV) is substantially equal to the amount of the hydrogen atom connected to the silicon atom of the component (II), i.e., the mol ratio therebetween is 0.95–1.05.

The addition reaction-type dimethylsilicone rubber composition is suitably used for an elastic coating material of an elastic revolution body which is used for conveying a sheet transfer material such as plain paper or plastic sheet, and/or for fixing an unfixed toner image to form a permanent image in various image forming apparatus such as electrophotographic copying machine and printer.

Hereinbelow, the elastic revolution body and fixing device according to the present invention are described.

The elastic revolution body according to the present invention may preferably comprise a substrate and an elastic (or elastomeric) coating layer. The substrate may preferably be a pipe or bar (preferably having a diameter of 5–100 mm) comprising a metal such as aluminum, iron and stainless steel. The elastic coating layer may preferably have a thickness of 0.1–10 mm.

FIG. 4 is a schematic side sectional view showing an embodiment of the fixing device according to the present invention. Referring to FIG. 4, a heat roller (hereinafter, referred to as "fixing roller") 1 and a pressure roller 2 are disposed so that they contact each other under an appropriate pressure, and are supported by bearings (not shown) so that they are disposed in upper and lower positions in parallel with each other. Each of these rollers 1 and 2 is rotated in the direction of an arrow shown in the figure.

The fixing roller 1 comprises a core of a hollow roller 11 formed of a metal such as aluminum, of which peripheral surface is covered with an elastic coating layer 12 comprising the addition reaction-type dimethylsilicone composition according to the present invention. A heater 13 such as halogen heater bar is disposed in the inner space of the core 11, and the core 11 is heated by heat generation due to the heater 13. The current applied to the heater 13 is controlled on and off, or the amount of the current is controlled by an automatic temperature control means (not shown), whereby the temperature of the outer peripheral surface is always controlled at a prescribed constant temperature.

The pressure roller 2 comprises a core 21 of a metal roller comprising iron, aluminum, etc., and a relatively thick layer 22 of an elastic material such as rubber covering the outer peripheral surface of the core 21. The addition reaction-type dimethylsilicone rubber composition according to the present invention can be used for the elastic material layer 22.

The fixing device shown in FIG. 4 further comprises a device 3 for applying a releasing aid or assistant such as dimethylsilicone oil onto the outer peripheral surface of the fixing roller 1. The application device 3 used in this embodiment comprises a continuous web member 31, a feed shaft 32, a wind-up shaft 33 and a pressing roller 34. The web member 31 is preliminarily impregnated with a releasing aid having a considerably high viscosity, is formed into a roll, and is loaded on the feed shaft 32. The free end of the roll web member 31 is hooked on the wind-up shaft 33 and the intermediate portion thereof disposed between the feed shaft 32 and wind-up shaft 33 is pressed to the surface of the fixing roller 1 by means of the pressing roller 34. The roll web member 31 on the feed shaft 32 side is gradually wound around the wind-up shaft 33, whereby the releasing aid which has soaked into the web member 31 is applied onto the outer peripheral surface of the fixing roller 1. The web member 31 may also function as a cleaning member for cleaning the outer surface of the fixing roller 1.

Under a condition under which the above-mentioned fixing roller 1 and pressure roller 2 are rotated, an image-supporting material 5 such as transfer material, electro-fax paper and electrostatic printing paper on which an unfixed toner image T has been formed and carried by an image-forming mechanism (not shown) such as electrophotography and electrostatic recording, is introduced into and passed through a nip portion 4 disposed between the above-mentioned two rollers so that the toner image-carrying surface of the image-supporting material 5 contacts the fixing roller 1. As a result, the toner image T is sequentially fixed onto the image-supporting material 5 under heat due to the fixing roller 1 and pressing force due to the fixing roller 1 and pressure roller 2 contacting each other, whereby a permanent fixed image is formed on the image-supporting material 5.

In FIG. 4, there are also disposed a separation claw member 6 for surely separating the image-supporting material 5 from the surface of the fixing roller 1, and a sensor 7 for detecting the temperature of the outer peripheral surface of the fixing roller 1 to regulate the temperature thereof. In FIG. 4, W denotes the width (in the moving direction of the image-supporting material 5) of the contact portion at which the fixing roller 1 and pressure roller 2 contact each other.

The layer 12 of a releasing material 12 covering the peripheral surface of the core 11 of the fixing roller 1 may generally be caused to have a considerably small thickness (e.g., about 0.5 mm or smaller), in order to rapidly supply heat due to the heater 13 to the outer surface of the above-mentioned layer 12 (i.e., the outer peripheral surface of the fixing roller 1) by heat conduction.

When the addition reaction-type dimethylsilicone rubber composition according to the present invention is used for the coating layer 12 of the fixing roller 1, since the cured product of the composition is an elastic material, the outer surface of the elastic coating layer 12 is deformed faithfully corresponding to the surface unevenness of the supporting material 5 per se and the unevenness of the toner image T disposed on the supporting material 5, whereby the outer surface uniformly contacts the respective portions of the uneven toner image T. Accordingly, the fixability of the toner image T to the surface of the image-supporting material 5 is entirely improved and the resultant fixed image entirely becomes good (i.e., the image quality of the fixed image is enhanced). As a result, the deformation or distortion of an image, gloss, and toner scattering, which have occurred when a rigid coating layer is used, is reduced or obviated.

Hereinbelow, the present invention is described in more detail with reference to Examples.

EXAMPLE 1

A silicone composition according to the present invention was prepared by using the following components (I), (II) and (IV) as main components.

Component (I): An organopolysiloxane copolymer comprising about 80 mol % of a diorganosiloxane unit represented by $(CH_3)_2SiO$, and 20 mol % of an organosiloxane comprising a 3,3,3-trifluoropropyl group represented by $CF_3CH_2CH_2(CH_3)SiO$, and having vinyl groups at both ends of the molecular chain, wherein the $CF_3CH_2CH_2(CH_3)SiO$ content was 20 mol %, and the ends of the molecular chiain were blocked by the vinyl groups. The component (I) used herein has a viscosity of about 1,000 centistoke at room temperature.

Component (II): An organopolysiloxane copolymer containing a hydrogen atom connected to a silicon atom, which comprise a diorganosiloxane unit represented by $(CH_3)_2SiO$ and an organosiloxane unit represented by $CF_3CH_2CH_2(CH_3)SiO$, and containing more than one hydrogen atom connected to a silicon atom on an average per one molecule.

Component (IV): A surface-modified synthetic hydrous silicic acid containing a reactive group, which had been modified by a fluoroalkylsilane and a vinyl group-containing silane.

The above-mentioned Component (IV) was prepared in the following manner.

100 g of synthetic hydrous silicic acid (trade name: Nipsil N 300A, mfd. by Nihon Silica K.K.) having a particle size of 0.1–7 microns and a BET specific surface area of 170 m$^2$/g was charged into a mixer. While the silicic acid was forcibly stirred by means of the mixer, 12 g of vinyltriethoxysilane was added thereto by spraying by use of $N_2$ gas, 12 g of 3,3,3-trifluoropropyltrimethoxysilane was added in the same manner as described above, and the resultant mixture was subjected to heat treatment at 100° C. for one hour under stirring, whereby the above-mentioned modified silicic acid was prepared.

| | |
|---|---|
| Constituent (i): | 100 wt. parts |
| An organopolysiloxane copolymer of the Component (I) wherein the end of the molecular chain was blocked by vinyl group and the number of the vinyl group was 6.00 × 10$^{-5}$ mol/g | |
| Constituent (ii): | 5 wt. parts |
| An organopolysiloxane of the Component (II) containing a hydrogen atom connected to a silicon atom, wherein the number of the hydrogen atom connected to the silicon atom was 2.46 × 10$^{-3}$ mol/g | |
| Constituent (iii): | 0.001 wt. part |
| A platinum-type catalyst component (III) | |
| Constituent (iv): | 10 wt. parts |
| A surface-modified synthetic hydrous silicic acid of the Component (IV) modified by 3,3,3-trifluoropropyltrimethoxysilane and vinyltriethoxysilane, wherein the number of the vinyl group was 3.8 × 10$^{20}$ groups/g | |
| Constituent (v): | 5 wt. parts |

| |
|---|
| -continued |
| Iron oxide (red iron oxide) |

The above-mentioned Constituents (i), (ii), (iii), (iv) and (v) were those constituting a composition according to the present invention, which was prepared so that the total amount of the vinyl group contained therein was substantially equal to that of the hydrogen atom connected to the silicon atom (12.3 × 10$^{-3}$ mol per 5 g of the Component (II)), i.e., the mol ratio therebetween was 1.0. The respective constituents were packed in the following manner so as to prepare a two-pack (or two-component) type of formulation.

| | |
|---|---|
| A-liquid | |
| Constituent (i) | 52.5 wt. parts |
| Constituent (iii) | 0.001 wt. parts |
| Constituent (iv) | 5 wt. parts |
| Constituent (v) | 2.5 wt. parts |
| B-liquid | |
| Constituent (i) | 47.5 wt. parts |
| Constituent (ii) | 5 wt. parts |
| Constituent (iv) | 5 wt. parts |
| Constituent (v) | 2.5 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 180° C. for 10 min., whereby a silicone rubber-like elastic body was obtained.

EXAMPLE 2

Modified synthetic hydrous silicic acid as a Component (IV) was prepared in the following manner.

100 g of synthetic hydrous silicic acid (trade name: Nipsil SS 30P, mfd. by Nihon Silica K.K.) having a particle size of 8.6 microns and a specific surface area of 114 m$^2$/g of which surface had been treated with about 9 wt. % of dimethylsilicone oil to be imparted with hydrophobicity, was charged into a mixer. While the silicic acid was forcibly stirred by means of the mixer, 12 g of vinyltriethoxysilane was added thereto by spraying by use of $N_2$ gas, and the resultant mixture was subjected to heat treatment at 100° C. for one hour, whereby the above-mentioned modified silicic acid was prepared.

A silicon rubber elastic body was prepared in the same manner as in Example 1 by using the following silicone composition.

| | |
|---|---|
| Constituent (i): | 100 wt. parts |
| An organopolysiloxane copolymer of the Component (I) wherein the end of the molecular chain was blocked by vinyl group and the number of the vinyl group was 6.00 × 10$^{-5}$ mol/g | |
| Constituent (ii): | 5 wt. parts |
| An organopolysiloxane of the Component (II) containing a hydrogen atom connected to a silicon atom, wherein the number of the hydrogen atom connected to the silicon atom was 2.46 × 10$^{-3}$ mol/g | |
| Constituent (iii): | 0.001 wt. part |
| A platinum catalyst component (III) | |
| Constituent (iv): | 10 wt. parts |
| A surface-modified synthetic hydrous silicic acid containing a reactive group which had been obtained by further modifying the synthetic | |

-continued

| | |
|---|---|
| hydrous silicic acid of the Component (IV) (imparted with hydrophobicity by dimethyl-silicone oil) by vinyltriethoxysilane, wherein the number of the vinyl group was $3.8 \times 10^{20}$ groups/g | |
| Constituent (v): | 5 wt. parts |
| Iron oxide | |

The above-mentioned Constituents (i) to (v) were those constituting a composition according to the present invention, which was prepared so that the total amount of the vinyl group contained therein was substantially equal to that of the hydrogen atom connected to the silicon atom. The respective constituents were packed in the following manner so as to prepare a two-pack type of formulation.

| A-liquid | |
|---|---|
| Constituent (i) | 52.5 wt. parts |
| Constituent (iii) | 0.001 wt. parts |
| Constituent (iv) | 5 wt. parts |
| Constituent (v) | 2.5 wt. parts |
| B-liquid | |
| Constituent (i) | 47.5 wt. parts |
| Constituent (ii) | 5 wt. parts |
| Constituent (iv) | 5 wt. parts |
| Constituent (v) | 2.5 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 180° C. for 10 min., whereby a silicone rubber-like elastic body was formed from the silicon rubber composition.

COMPARATIVE EXAMPLE 1

A silicon rubber-like elastic body was prepared in the same manner as in Example 1 by using the following silicone composition.

| | |
|---|---|
| Constituent (i): | 100 wt. parts |
| An organopolysiloxane copolymer of the Component (I) wherein the end of the molecular chain was blocked by vinyl group and the number of the vinyl group was $6.00 \times 10^{-5}$ mol/g | |
| Constituent (ii): | 2.44 wt. parts |
| An organopolysiloxane of the Component (II) containing a hydrogen atom connected to a silicon atom, wherein the number of the hydrogen atom connected to the silicon atom was $2.46 \times 10^{-3}$ mol/g | |
| Constituent (iii): | 0.001 wt. part |
| Platinum-type catalyst | |
| Constituent (v): | 5 wt. parts |
| Iron oxide | |

The above-mentioned composition was prepared so that the total amount (mol) of the vinyl group contained therein was substantially equal to that of the hydrogen atom connected to the silicon atom. The respective constituents were packed in the following manner so as to prepare a two-pack type of formulation.

| A-liquid | |
|---|---|
| Constituent (i) | 51.22 wt. parts |
| Constituent (iii) | 0.001 wt. parts |
| Constituent (v) | 2.5 wt. parts |
| B-liquid | |
| Constituent (i) | 48.78 wt. parts |
| Constituent (ii) | 2.44 wt. parts |
| Constituent (v) | 2.5 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 180° C. for 10 min., whereby a silicone rubber-like elastic body was formed from the silicone rubber composition.

COMPARATIVE EXAMPLE 2

A silicon rubber-like elastic body was prepared in the same manner as in Example 1 by using the following silicone composition.

| | |
|---|---|
| Constituent (i): | 100 wt. parts |
| An organopolysiloxane copolymer of the Component (I) wherein the end of the molecular chain was blocked by vinyl group and the number of the vinyl group was $6.00 \times 10^{-5}$ mol/g | |
| Constituent (ii): | 2.44 wt. parts |
| An organopolysiloxane of the Component (II) containing a hydrogen atom connected to a silicon atom, wherein the number of the hydrogen atom connected to the silicon atom was $2.46 \times 10^{-3}$ mol/g | |
| Constituent (iii): | 0.001 wt. part |
| Platinum catalyst | |
| Constituent (iv): | 10 wt. parts |
| Synthetic hydrous silicic acid (Nipsil N 300A, mfd. by Nihon Silica K.K.) having a particle size of 0.1–7 microns, and a specific surface area of 170 m²/g | |
| Constituent (v): | 5 wt. parts |
| Iron oxide | |

The above-mentioned composition was prepared so that the total amount of the vinyl group contained therein was substantially equal to that of the hydrogen atom connected to the silicon atom. The respective constituents were packed in the following manner so as to prepare a two-pack type of formulation.

| A-liquid | |
|---|---|
| Constituent (i) | 51.22 wt. parts |
| Constituent (iii) | 0.001 wt. parts |
| Constituent (iv) | 5 wt. parts |
| Constituent (v) | 2.5 wt. parts |
| B-liquid | |
| Constituent (i) | 48.78 wt. parts |
| Constituent (ii) | 2.44 wt. parts |
| Constituent (iv) | 5 wt. parts |
| Constituent (v) | 2.5 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 180° C. for 10 min., whereby a silicone rubber-like elastic body was formed from the silicone rubber composition.

COMPARATIVE EXAMPLE 3

Modified synthetic hydrous silicic acid as a Component (IV) was prepared in the following manner.

100 g of synthetic hydrous silicic acid (trade name: Nipsil N 300A, mfd. by Nihon Silica K.K.) having a particle size of 0.1–7 microns and a specific surface area of 170 m$^2$/g was charged into a mixer. While the silicic acid was forcibly stirred by means of the mixer, 12 g of vinyltriethoxysilane was added thereto by spraying by use of N$_2$ gas, and the resultant mixture was subjected to heat treatment at 100° C. for one hour, whereby the above-mentioned modified silicic acid was prepared.

A silicon rubber-like elastic body was prepared in the same manner as in Example 1 by using the following silicone composition.

| Constituent (i): | 100 wt. parts |
|---|---|
| An organopolysiloxane copolymer of the Component (I) wherein the end of the molecular chain was blocked by vinyl group and the number of the vinyl group was 6.00 × 10$^{-5}$ mol/g | |
| Constituent (ii): | 5 wt. parts |
| An organopolysiloxane of the Component (II) containing a hydrogen atom connected to a silicon atom, wherein the number of the hydrogen atom connected to the silicon atom was 2.46 × 10$^{-3}$ mol/g | |
| Constituent (iii): | 0.001 wt. part |
| Platinum catalyst | |
| Constituent (iv): | 10 wt. parts |
| Surface-modified synthetic hydrous silicic acid modified only by vinyltriethoxysilane, wherein the number of the vinyl group was 3.8 × 10$^{20}$ groups/g | |
| Constituent (v): | 5 wt. parts |
| Iron oxide | |

The above-mentioned composition was prepared so that the total amount of the vinyl group contained therein was substantially equal to that of the hydrogen atom connected to the silicon atom. The respective constituents were packed in the following manner so as to prepare a two-pack type of formulation.

| A-liquid | |
|---|---|
| Constituent (i) | 52.5 wt. parts |
| Constituent (iii) | 0.001 wt. parts |
| Constituent (iv) | 5 wt. parts |
| Constituent (v) | 2.5 wt. parts |
| B-liquid | |
| Constituent (i) | 47.5 wt. parts |
| Constituent (ii) | 5 wt. parts |
| Constituent (iv) | 5 wt. parts |
| Constituent (v) | 2.5 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 180° C. for 10 min., whereby a silicone rubber-like elastic body was formed from the silicone rubber composition.

COMPARATIVE EXAMPLE 4

Modified synthetic hydrous silicone rubber as a Component (IV) was prepared in the following manner.

100 g of synthetic hydrous silicic acid (trade name: Nipsil N 300A, mfd. by Nihon Silica K.K.) having a particle size of 0.1–7 microns and a specific surface area of 170 m$^2$/g was charged into a mixer. While the silicic acid was forcibly stirred by means of the mixer, 12 g of 3,3,3-trifluoropropyltrimethoxysilane was added thereto by spraying by use of N$_2$ gas, and the resultant mixture was subjected to heat treatment at 100° C. for one hour, whereby the above-mentioned modified silicic acid was prepared.

A silicon rubber-like elastic body was prepared in the same manner as in Example 1 by using the following silicone composition.

| Constituent (i): | 100 wt. parts |
|---|---|
| An organopolysiloxane copolymer of the Component (I) wherein the end of the molecular chain was blocked by vinyl group and the number of the vinyl group was 6.00 × 10$^{-5}$ mol/g | |
| Constituent (ii): | 2.44 wt. parts |
| An organopolysiloxane of the Component (II) containing a hydrogen atom connected to a silicon atom, wherein the number of the hydrogen atom connected to the silicon atom was 2.46 × 10$^{-3}$ mol/g | |
| Constituent (iii): | 0.001 wt. part |
| platinum catalyst | |
| Constituent (iv): | 10 wt. parts |
| Surface-modified synthetic hydrous silicic acid of the Component (IV) modified only by 3,3,3-trifluoropropyltrimethoxysilane | |
| Constituent (v): | 5 wt. parts |
| Iron oxide | |

The above-mentioned composition was prepared so that the total amount of the vinyl group contained therein was substantially equal to that of the hydrogen atom connected to the silicon atom. The respective constituents were packed in the following manner so as to prepare a two-pack type of formulation.

| A-liquid | |
|---|---|
| Constituent (i) | 51.22 wt. parts |
| Constituent (iii) | 0.001 wt. parts |
| Constituent (iv) | 5 wt. parts |
| Constituent (v) | 2.5 wt. parts |
| B-liquid | |
| Constituent (i) | 48.78 wt. parts |
| Constituent (ii) | 2.44 wt. parts |
| Constituent (iv) | 5 wt. parts |
| Constituent (v) | 2.5 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 180° C. for 10 min., whereby a silicone rubber-like elastic body was formed from the silicone rubber composition.

COMPARATIVE EXAMPLE 5

Modified synthetic hydrous silicic acid as a Component (IV) was prepared in the following manner.

Synthetic hydrous silicic acid (trade name: Nipsil SS-30P, mfd. by Nihon Silica K.K.) having a particle size of 8.6 microns and a specific surface area of 114 m$^2$/g (after the treatment) treated with dimethylsilicone oil alone.

A silicone rubber-like elastic body was prepared in the same manner as in Example 1 by using the following silicone composition.

| Constituent (i): | 100 wt. parts |
|---|---|
| An organopolysiloxane copolymer of the Component (I) wherein the end of the molecular chain was blocked by vinyl group and the number of the vinyl group was $6.00 \times 10^{-5}$ mol/g | |
| Constituent (ii): | 2.44 wt. parts |
| An organopolysiloxane of the Component (II) containing a hydrogen atom connected to a silicon atom, wherein the number of the hydrogen atom connected to the silicon atom was $2.46 \times 10^{-3}$ mol/g | |
| Constituent (iii): | 0.001 wt. part |
| platinum catalyst | |
| Constituent (iv): | 2.44 wt. parts |
| Surface-modified synthetic hydrous silicic acid of the Component (IV) modified only by the dimethylsilicone oil | |
| Constituent (v): | 5 wt. parts |
| Iron oxide | |

The above-mentioned composition was prepared so that the total amount of the vinyl group contained therein was substantially equal to that of the hydrogen atom connected to the silicon atom. The respective constituents were packed in the following manner so as to prepare a two-pack type of formulation.

| A-liquid | |
|---|---|
| Constituent (i) | 51.22 wt. parts |
| Constituent (iii) | 0.001 wt. parts |
| Constituent (iv) | 5 wt. parts |
| Constituent (v) | 2.5 wt. parts |
| B-liquid | |
| Constituent (i) | 48.78 wt. parts |
| Constituent (ii) | 2.44 wt. parts |
| Constituent (iv) | 5 wt. parts |
| Constituent (v) | 2.5 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 180° C. for 10 min., whereby a silicone rubber-like elastic body was formed from the silicone rubber composition.

Some physical properties and toner releasability of the above-mentioned elastic materials obtained in Examples 1 and 2, and Comparative Examples 1 to 5 are shown in the following Table 1.

TABLE 1

|  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Hardness *1 (JIS A) | 40 | 40 | 20 | 25 | 34 | 28 | 28 |
| Impact resilience *1 (%) | 81 | 78 | 90 | 63 | 76 | 66 | 65 |
| Tensile strength *1 (kgf/cm$^2$) | 35 | 25 | 3 | 5 | 15 | 8 | 7 |
| Elongation (%) | 250 | 200 | 200 | 150 | 200 | 180 | 190 |
| Tearing strength *1 (kgf/cm) | 15 | 10 | 1 | 3 | 6 | 4 | 3 |
| Toner releasability *2 (%) | 84 | 80 | 88 | 40 | 45 | 65 | 63 |

*1: These properties were evaluated according to JIS K 6301.
*2: The toner-releasability was evaluated in the following manner.

50 circular toner images having a diameter of 2 mm and a thickness of 50 microns were formed on a sample rubber piece (20 mm×60 mm×15 mm), and the toner images were heat-melted at an environmental temperature of 180° C. for 30 min., and then cooled to room temperature to be solidified. An adhesive tape (Union-A tape mfd. by Union Kogyo K.K.) was attached to the toner images, and along the tape, a rigid roller was reciprocated ten times, and then the tape was peeled.

The thus obtained peeling conditions of the toner images were classified into five classes, and the numbers of the toner images allotted to the classes were respectively measured and marked. The sums of the thus obtained marks were calculated and divided by the total marks to obtain percentages. The toner releasability was represented by the thus obtained percentage.

The peeling conditions of the toner images were classified in the following manner.

A: A state wherein the toner image was completely released (4 marks)

B: An intermediate state between the state A and the state C (3 marks)

C: A state wherein ½ of total area was released (2 marks)

D: An intermediate state between the state C and the state D (1 mark)

E: A state wherein the toner image completely remained (O mark)

The toner releasability was calculated according to the following formula:

$$\text{Toner releasability } (\%) = 1/200 \times (4 \times a + 3 \times b + 2 \times c + 1 \times d + 0 \times e) \times 100,$$

wherein $a+b+c+d+e=50$.

The above-mentioned sample piece was used after it was subjected to aging at 200° C. for 4 hours.

EXAMPLE 3

While the addition amount of the Component (IV) used in Example 1, i.e., the surface-modified synthetic hydrous silicic acid containing a reactive group which had been modified by 3,3,3-trifluoropropyltrimethoxysilane and vinyltriethoxysilane was 10 wt. % based on the total amount of the composition, and the mole of the vinyl group (hereinafter, referred to as "Vi") contained in the Component (I), and the hydrogen atom (hereinafter, referred to "H") bonded to the silicon atom of the Component (II) were changed. The mole ratio between the hydrogen atom bonded to the silicon atom (H) and the reactive vinyl group (Vi) was represented by H/Vi. More specifically, 100 wt. parts of the Component (I) was used and the proportion of the Component (II) to be mixed therewith was changed, whereby the mol ratio of H/Vi was changed.

Figure 2:
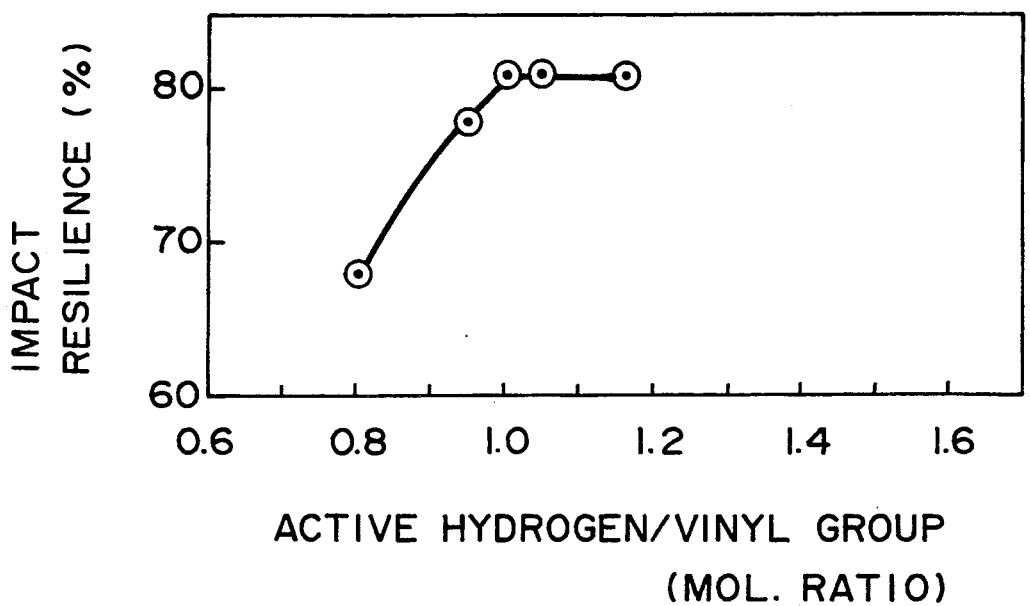

While the ratio H/Vi was changed, various silicone compositions corresponding to the respective H/Vi values were prepared in the same manner as in Example 1, hardened under heating in a heat press at 180° C. for 10 min., and further subjected to aging at 200° C. for 4 hours. The hardness, impact resilience, and toner-releasability of the resultant products were evaluated in the same manner as in Table 1. The results are shown in FIGS. 1, 2 and 3.

From the results of the hardness and impact resilience, it was clear that the vinyl group of the Component (III) of the surface-modified synthetic hydrous silicic acid containing a vinyl group reacted with the hydrogen group of the Component (II). More specifically, as the value of the H/Vi increased (i.e., the amount of the active hydrogen atom became larger), the hardness and impact resilience of the silicone rubber increased, as shown in FIGS. 1 and 2. Accordingly, it is clear that the vinyl groups present at the surface of the silicic acid fine powder reacted with the polysiloxane having an active hydrogen atom, whereby the cross-linking structure became stronger (or crosslinking bonds increased).

Figure 3:
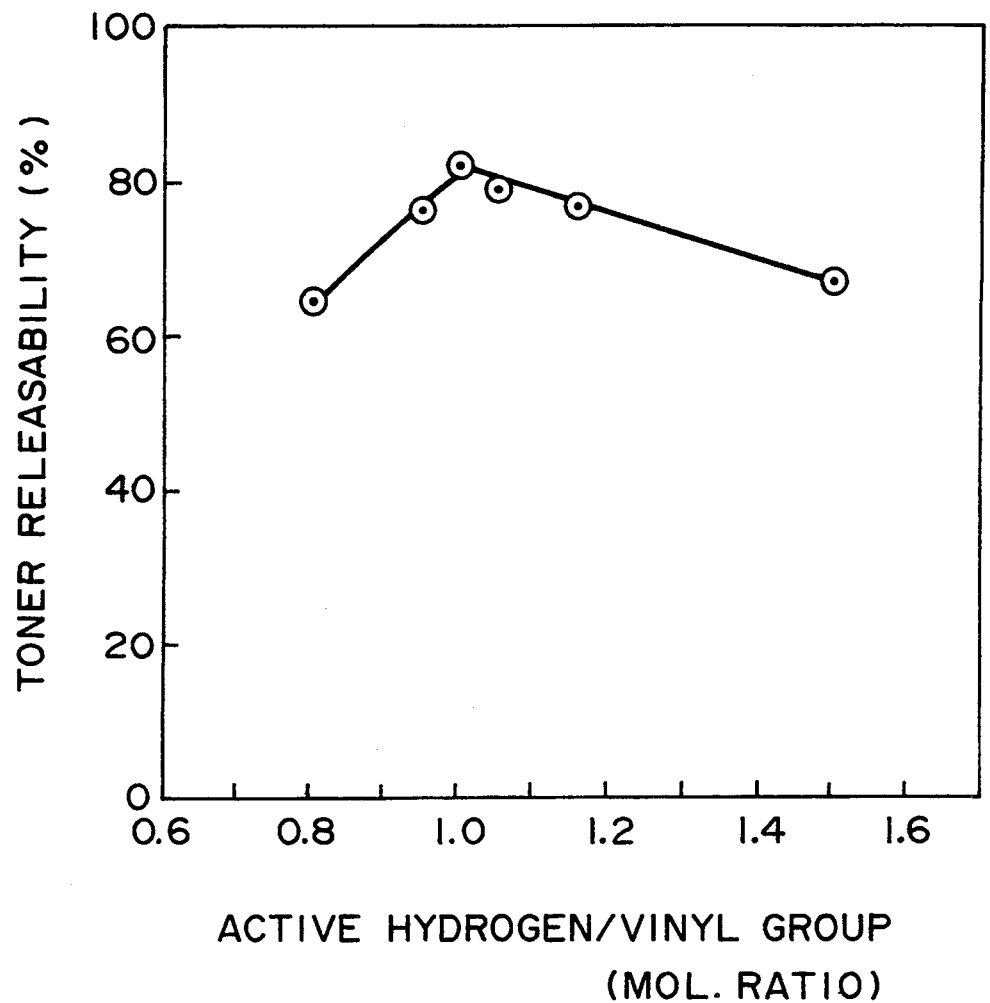

Further, when H/Vi=1.0, (i.e., mole of the vinyl group was equal to that of the hydrogen atom bonded to the silicon atom), the toner-releasability became maximum, as shown in FIG. 3.

EXAMPLE 4

The addition reaction-type silicone rubber compositions A and B obtained in Example 1 were uniformly mixed at a weight ratio of 100:100, and then degassed to prepare a liquid mixture. The mixture was injected into a cylindrical metal mold in which an aluminum core bar for a heat-fixing roller to be used in an electrophotographic copying machine with an outside diameter of 60 mm coated with a siloxane-type primer had been disposed in advance and had preliminarily been heated up to 150° C., and kept at the same temperature for 5 min. thereby to cure and mold the mixture. After the curing, the thus formed fixing roller covered with the silicone rubber was taken out from the metal mold. The silicone rubber covering layer had a thickness of 0.5 mm.

The thus obtained fixing roller was disposed in a heat fixing device as shown in FIG. 4, and a fixing test was conducted while sheets of paper were continuously passed through the fixing device under the following conditions.

FIXING CONDITIONS

Controlled temperature of fixing roller 1 surface: 175°–185° C.

Oil application device 3: A web-type application device including a paper web (trade name: Normex Web, mfd. by Japan Vilene Co., Ltd.) impregnated with a silicone oil (KP96H, mfd. by Shinetsu Kagaku K.K.) having a viscosity of 10,000 cs at 25° C.

Web feed speed: 1 m per 10,000 sheets of paper supply (A-4 size)

Supplied paper: A4 size transfer paper (plain paper) on which an unfixed toner image corresponding to a test pattern was formed.

Paper supply speed: 50 sheets/min.

Nip width (W) between the fixing roller 1 and pressure roller 2: 9–10 mm

As a result, even after 300,000 sheets of paper were passed through the fixing device, the fixing roller 1 retained good releasability, and considerable toner offset or sheet jamming trouble due to the toner offset, which was practically problematic, did not occur, and the image quality of the fixed image was well retained. Further, the durability of the roller was excellent (i.e., roller life was considerably long).

EXAMPLE 5

A fixing roller was prepared in the same manner as in Example 4 except that the liquid addition reaction-type silicone rubber obtained in Example 2 was used, and was subjected to a fixing test while sheets of paper were continuously passed through the fixing device.

As a result, until 200,000 sheets of paper were passed through the fixing device, the fixing roller 1 retained good releasability, and considerable toner offset or sheet jamming trouble due to the toner offset, which was practically problematic, did not occur, and the image quality of the fixed image was well retained. Further, the durability of the roller was excellent (i.e., roller life was considerably long).

COMPARATIVE EXAMPLES 6–10

Fixing rollers were prepared in the same manner as in Example 4 except that the silicone compositions (the liquid addition reaction-type silicone rubber compositions) obtained in Comparative Examples 1–5 were used, and were subjected to a fixing test while sheets of paper were continuously passed through the fixing device.

COMPARATIVE EXAMPLE 11

A fixing roller was prepared in the same manner as in Example 4 except that the a commercially available liquid addition reaction-type silicone rubber composition providing a hardness (JIS A) of 40 was used, and was subjected to a fixing test while sheets of paper were continuously passed through the fixing device.

The results obtained in Examples 4 and 5, and Comparative Examples 6–11 are shown in the following Table 2.

TABLE 2

| Fixing roller | Silicone composition used | Results of paper passage test |
|---|---|---|
| Example 4 | Example 1 | No offset occurred even after 300,000 sheets. |
| Example 5 | Example 2 | No offset occurred even after 200,000 sheets. |
| Comp. Example 6 | Comp. Example 1 | Rubber breakage occurred at the time of 20,000 sheets. |
| Comp. Example 7 | Comp. Example 2 | Offset occurred at the time of 30,000 sheets. |
| Comp. Example 8 | Comp. Example 3 | Offset occurred at the time of 50,000 sheets. |
| Comp. Example 9 | Comp. Example 4 | Offset occurred at the time of 120,000 sheets. |
| Comp. Example 10 | Comp. Example 5 | Offset occurred at the time of 100,000 sheets. |
| Comp. Example 11 | Comp. Example 11 | Offset occurred at the time of 10,000 sheets. |

EXAMPLE 6

| | |
|---|---|
| Constituent (I): | 100 wt. parts |
| A vinyl group-containing dimethylpolysiloxane (viscosity: 1,000 centistoke) comprising dimethylpolysiloxane of which end was blocked by a vinyl group, and vinyl group-containing dimethylpolysiloxane of which end is blocked by a methyl group, wherein the total number of vinyl group was $8.0 \times 10^{-5}$ mol/g | |
| Constituent (II): | 7.15 wt. parts |
| A methylhydrogenpolysiloxane wherein the number of hydrogen atom bonded to the silicon atom was $2.0 \times 10^{-3}$ mol/g | |

| | |
|---|---|
| (The total amount of the hydrogen atom bonded to the silicon atom was 14.3 × 10⁻³ mol/g, per 7.15 g of the Component (II).) | |
| Constituent (III): | 0.001 wt. part |
| Platinum catalyst | |
| Constituent (IV): | 10 wt. parts |
| Surface-modified synthetic hydrous silicic acid containing a vinyl group of which surface had been modified by dimethylsilicone oil and a vinyl group-containing silane compound | |
| Constituent (V): | 1 wt. part |
| Red iron oxide | |

The above-mentioned constituent (IV) was prepared in the following manner.

100 wt. parts of synthetic hydrous silicic acid (trade name: Nipsil SS 30P, mfd. by Nihon Silica K.K.) having an average particle size of 8.6 microns and a specific surface area of 114 m²/g, of which surface had been treated with about 9 wt. % of dimethylsilicone oil, was charged into a stirrer. While the silicic acid was forcibly stirred by means of the stirrer, 12 wt. parts of vinyltriethoxysilane was gradually dripped thereto, the resultant mixture was then taken out from the stirrer, and thereafter was air-dried at 100° C. for one hour, whereby the above-mentioned surface-treated synthetic hydrous silicic acid containing a vinyl group was obtained. In the resultant powder, the amount of the vinyl group was about $3.8 \times 10^{20}$ groups per 1 g of the powder.

The above-mentioned Constituents (i) to (v) were those constituting a composition according to the present invention, which was prepared so that the total amount of the vinyl group contained therein was substantially equal to that of the hydrogen atom bonded to the silicon atom. The respective constituents were packed in the following manner so as to prepare a two-pack (or two-component) type of formulation.

| A-liquid | |
|---|---|
| Constituent (I) | 45.35 wt. parts |
| Constituent (III) | 0.001 wt. parts |
| Constituent (IV) | 4.23 wt. parts |
| Constituent (V) | 0.43 wt. parts |
| B-liquid | |
| Constituent (I) | 39.29 wt. parts |
| Constituent (II) | 6.05 wt. parts |
| Constituent (IV) | 4.23 wt. parts |
| Constituent (V) | 0.43 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 150° C. for 10 min., whereby a silicone rubber-like elastic body formed from the silicone rubber composition. The rubber-like elastic body was further subjected to post curing at 200° C. for 4 hours.

EXAMPLE 7

| Constituent (I): | 100 wt. parts |
|---|---|
| A vinyl group-containing dimethylpolysiloxane comprising dimethylpolysiloxane of which end was blocked by a vinyl group, and vinyl group-containing dimethylpolysiloxane of which end is blocked by a methyl group, wherein the total number of vinyl group was 8.0 × 10⁻⁵ mol/g | |
| Constituent (II): | 7.15 wt. parts |
| A methylhydrogenpolysiloxane wherein the number of hydrogen atoms bonded to the silicon atom was 2.0 × 10⁻³ mol/g | |
| Constituent (III): | 0.001 wt. part |
| Platinum catalyst | |
| Constituent (IV): | 10 wt. parts |
| Surface-modified synthetic anhydrous hydrophobic silicic acid containing a vinyl group of which surface had been modified by a vinyl group-containing silane compound | |
| Constituent (V): | 1 wt. part |
| Red iron oxide | |

The above-mentioned constituent (IV) was prepared in the following manner.

100 wt. parts of synthetic anhydrous hydrophobic silicic acid (trade name: Aerosil R-812, mfd. by Degusa Co.) having a specific surface area of 200 m²/g and a bulk specific gravity of 50 g/l, of which surface had been treated with about 6 wt. % of dimethyldichlorosilane was charged into a stirrer. While the silicic acid was forcibly stirred by means of the stirrer, 12 g of vinyltriethoxysilane was gradually dripped thereto, the resultant mixture was then taken out from the stirrer, and thereafter was air-dried at 100° C. for one hour, whereby the above-mentioned surface-treated synthetic anhydrous silicic acid containing a vinyl group was obtained. In the resultant powder, the amount of the vinyl group was about $3.8 \times 10^{20}$ groups per 1 g of the powder.

The above-mentioned Constituents (i) to (v) were those constituting a composition according to the present invention, which was prepared so that the total amount of the vinyl group contained therein was substantially equal to that of the hydrogen atom bonded to the silicon atom. The respective constituents were packed in the following manner so as to prepare a two-pack (or two-component) type of formulation.

| A-liquid | |
|---|---|
| Constituent (I) | 45.35 wt. parts |
| Constituent (III) | 0.001 wt. parts |
| Constituent (IV) | 4.23 wt. parts |
| Constituent (V) | 0.43 wt. parts |
| B-liquid | |
| Constituent (I) | 39.29 wt. parts |
| Constituent (II) | 6.05 wt. parts |
| Constituent (IV) | 4.23 wt. parts |
| Constituent (V) | 0.43 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 150° C. for 10 min., whereby a silicone rubber-like elastic body formed from the silicone rubber composition. The rubber-like elastic body was further subjected to post curing at 200° C. for 4 hours.

EXAMPLE 8

A composition according to the present invention was formed from the Constituents (I), (II) and (III) used in Example 6 and Constituent (IV) prepared in the following manner.

100 wt. parts synthetic hydrous silicic acid (trade name: Nipsil N 300A, mfd. by Nihon Silica K.K.) having an average particle size of 2 microns and a specific surface area of 170 m²/g was charged into a stirrer.

While the silicic acid was forcibly stirred by means of the stirrer, 3 wt. parts of methyltrimethoxysilane was gradually dripped thereto and then 12 wt. parts of vinyltriethoxysilane was further gradually dripped therein. After the dripping was completed, the powder was taken out from the stirrer, and thereafter was air-dried at 100° C. for one hour, whereby the above-mentioned surface-treated synthetic hydrous silicic acid containing a vinyl group was obtained. In the resultant powder, the amount of the vinyl group was about $3.8 \times 10^{20}$ groups per 1 g of the powder.

The above-mentioned Constituents (i) to (v) were those constituting a composition according to the present invention, which was prepared so that the total amount of the vinyl group contained therein was substantially equal to that of the hydrogen atom bonded to the silicon atom. The respective constituents were packed in the following manner so as to prepare a two-pack type of formulation.

| A-liquid | |
|---|---|
| Constituent (I) | 45.35 wt. parts |
| Constituent (III) | 0.001 wt. parts |
| Constituent (IV) | 4.23 wt. parts |
| Constituent (V) | 0.43 wt. parts |
| B-liquid | |
| Constituent (I) | 39.29 wt. parts |
| Constituent (II) | 6.05 wt. parts |
| Constituent (IV) | 4.23 wt. parts |
| Constituent (V) | 0.43 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 150° C. for 10 min., whereby a silicone rubber-like elastic body formed from the silicone rubber composition. The rubber-like elastic body was further subjected to post curing at 200° C. for 4 hours.

COMPARATIVE EXAMPLE 12

There was prepared a liquid A (viscosity: 800 poise) which comprised 100 wt. parts of a vinyl group-containing dimethylpolysiloxane, 5 wt. parts of synthetic anhydrous silicic acid, 20 wt. parts of quarts powder, 1 wt. parts of red iron oxide and a platinum-type catalyst.

Separately, there was prepared a liquid B (viscosity: 600 poise) which comprised 100 wt. parts of mixture (comprising a vinyl group—containing diorganopolysiloxane and an active hydrogen group-containing siloxane), 5 wt. parts of synthetic anhydrous silicic acid, 20 wt. parts of quartz powder, and 1 wt. parts of red iron oxide.

The A-liquid and B-liquid were mixed at a wt. ratio of 100:100, degassed, and heated in a heat press at 150° C. for 10 min, whereby a silicone rubber-like elastic body was formed from the silicone rubber composition. The rubber-like elastic body was further subjected to post curing at 200° C. for 4 hours.

COMPARATIVE EXAMPLE 13

A rubber-like elastic body was obtained in the same manner as in Comparative Example 12 except that 30 wt. % of the synthetic anhydrous silicic acid was used.

COMPARATIVE EXAMPLE 14

| | |
|---|---|
| Constituent (I): | 100 wt. parts |
| A vinyl group-containing dimethylpolysiloxane comprising dimethylpolysiloxane of which end was blocked by a vinyl group, and vinyl group-containing dimethylpolysiloxane of which end is blocked by a methyl group, wherein the total number of vinyl group was $8.0 \times 10^{-5}$ mol/g | |
| Constituent (II): | 4 wt. parts |
| A methylhydrogenpolysiloxane wherein the number of hydrogen atoms bonded to the silicon atom was $2.0 \times 10^{-3}$ mol/g | |
| Constituent (III): | 0.001 wt. part |
| Platinum catalyst | |
| Constituent (V): | 1 wt. part |
| Red iron oxide | |

The above-mentioned Constituents (I), (II), (III) and (V) were those constituting a silicone composition which was prepared so that the total amount of the vinyl group contained therein was substantially equal to that of the hydrogen atom bonded to the silicon atom. The respective constituents were packed in the following manner so as to prepare a two-pack type of formulation.

| A-liquid | |
|---|---|
| Constituent (I) | 52 wt. parts |
| Constituent (III) | 0.001 wt. parts |
| Constituent (V) | 0.5 wt. parts |
| B-liquid | |
| Constituent (I) | 48 wt. parts |
| Constituent (II) | 4 wt. parts |
| Constituent (V) | 0.5 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 150° C. for 10 min., whereby a silicone rubber-like elastic body was formed from the silicone rubber composition. The rubber-like elastic body was further subjected to post curing at 200° C. for 4 hours.

COMPARATIVE EXAMPLE 15

| | |
|---|---|
| Constituent (I): | 100 wt. parts |
| A vinyl group-containing dimethylpolysiloxane comprising dimethylpolysiloxane of which end was blocked by a vinyl group, and vinyl group-containing dimethylpolysiloxane of which end is blocked by a methyl group, wherein the total number of vinyl group was $8.0 \times 10^{-5}$ mol/g | |
| Constituent (II): | 7.15 wt. parts |
| A methylhydrogenpolysiloxane wherein the number of hydrogen atoms bonded to the silicon atom was $2.0 \times 10^{-3}$ mol/g | |
| Constituent (III): | 0.001 wt. part |
| Platinum catalyst | |
| Constituent (IV): | 10 wt. parts |
| Surface-modified synthetic hydrous silicic acid containing a vinyl group of which surface had been modified by a vinyl group-containing silane compound | |
| Constituent (V): | 1 wt. part |
| Red iron oxide | |

The above-mentioned constituent (IV) was prepared in the following manner.

100 wt. parts of synthetic hydrous silicic acid (trade name: Nipsil N-300A, mfd. by Nihon Silica K.K.) having an average particle size of 2 microns and a specific surface area of 170 m²/g, was charged into a stirrer. While the silicic acid was forcibly stirred by means of the stirrer, 12 wt. parts of vinyltriethoxysilane was gradually dripped thereto, the resultant mixture was then taken out from the stirrer, and thereafter was air-dried at 100° C. for one hour, whereby the above-mentioned surface-treated synthetic hydrous silicic acid containing a vinyl group was obtained. In the resultant powder, the amount of the vinyl group was about $3.8 \times 10^{20}$ groups per 1 g of the powder.

The above-mentioned Constituents (I) to (V) were those constituting a silicone composition, which was prepared so that the total amount of the vinyl group contained therein was substantially equal to that of the hydrogen atom bonded to the silicon atom. The respective constituents were packed in the following manner so as to prepare a two-component type of formulation.

| A-liquid | |
|---|---|
| Constituent (I) | 45.35 wt. parts |
| Constituent (III) | 0.001 wt. parts |
| Constituent (IV) | 4.23 wt. parts |
| Constituent (V) | 0.43 wt. parts |
| B-liquid | |
| Constituent (I) | 39.29 wt. parts |
| Constituent (II) | 6.05 wt. parts |
| Constituent (IV) | 4.23 wt. parts |
| Constituent (V) | 0.43 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 150° C. for 10 min., whereby a silicone rubber-like elastic body was formed from the silicone rubber composition. The rubber-like elastic body was further subjected to post curing at 200° C. for 4 hours.

COMPARATIVE EXAMPLE 16

| | |
|---|---|
| Constituent (I): | 100 wt. parts |
| A vinyl group-containing dimethylpolysiloxane comprising dimethylpolysiloxane of which end was blocked by a vinyl group, and vinyl group-containing dimethylpolysiloxane of which end is blocked by a methyl group, wherein the total number of vinyl group was $8.0 \times 10^{-5}$ mol/g | |
| Constituent (II): | 4 wt. parts |
| A methylhydrogenpolysiloxane wherein the number of hydrogen atoms bonded to the silicon atom was $2.0 \times 10^{-3}$ mol/g | |
| Constituent (III): | 0.001 wt. part |
| Platinum catalyst | |
| Constituent (IV): | 10 wt. parts |
| Surface-modified synthetic hydrous silicic acid containing a vinyl group of which surface had been modified by methyltrimethoxysilane | |
| Constituent (V): | 1 wt. part |
| Red iron oxide | |

The above-mentioned constituent (IV) was prepared in the following manner.

100 wt. parts of synthetic hydrous silicic acid (trade name: Nipsil N 300A, mfd. by Nihon Silica K.K.) having an average particle size of 2 microns and a specific surface area of 170 m²/g, was charged into a stirrer. While the silicic acid was forcibly stirred by means of the stirrer, 3 wt. parts of methyltriethoxysilane was gradually dripped thereto, the resultant mixture was then taken out from the stirrer, and thereafter was air-dried at 100° C. for one hour, whereby the above-mentioned surface-treated synthetic hydrous silicic acid was obtained.

The above-mentioned Constituents (I) to (V) were those constituting a silicone composition which was prepared so that the total amount of the vinyl group contained therein was substantially equal to that of the hydrogen atom bonded to the silicon atom. The respective constituents were packed in the following manner so as to prepare a two-component type of formulation.

| A-liquid | |
|---|---|
| Constituent (I) | 52 wt. parts |
| Constituent (III) | 0.001 wt. parts |
| Constituent (IV) | 5 wt. parts |
| Constituent (V) | 0.5 wt. parts |
| B-liquid | |
| Constituent (I) | 48 wt. parts |
| Constituent (II) | 4 wt. parts |
| Constituent (IV) | 5 wt. parts |
| Constituent (V) | 0.5 wt. parts |

The above-mentioned components were uniformly mixed to prepare the A-liquid and B-liquid, respectively. The thus prepared A-liquid and B-liquid were mixed at a wt. ratio of 100:100, degassed, and heated in a heat press at 150° C. for 10 min., whereby a silicone rubber-like elastic body was formed from the silicone rubber composition. The rubber-like elastic body was further subjected to post curing at 200° C. for 4 hours.

Some physical properties and toner-releasability of the above-mentioned elastic materials obtained in Examples 6 to 8, and Comparative Examples 12 to 16 are shown in the following Table 3.

TABLE 3

| | Ex. 6 | Ex. 7 | Ex. 8 | Comp. Ex. 12 | Comp. Ex. 13 | Comp. Ex. 14 | Comp. Ex. 15 | Comp. Ex. 16 |
|---|---|---|---|---|---|---|---|---|
| Hardness (JIS A) | 30 | 35 | 30 | 25 | 55 | 12 | 30 | 30 |
| Tensile strength (Kgf/cm²) | 28 | 40 | 31 | 15 | 70 | 5 | 34 | 10 |
| Elongation (%) | 250 | 200 | 230 | 270 | 180 | 270 | 230 | 260 |
| Tearing strength (Kgf/cm, JIS B) | 13 | 20 | 16 | 5 | 10 | 2 | 18 | 6 |

TABLE 3-continued

|                       | Ex. 6 | Ex. 7 | Ex. 8 | Comp. Ex. 12 | Comp. Ex. 13 | Comp. Ex. 14 | Comp. Ex. 15 | Comp. Ex. 16 |
| --- | --- | --- | --- | --- | --- | --- | --- | --- |
| Toner-releasability* (%) | 76 | 74 | 76 | 40 | 20 | 90 | 52 | 74 |

*The toner-releasability was evaluated in the same manner as in Table 1.

EXAMPLE 9

The addition amount of the Constituent (IV) used in Example 6, i.e., the surface-modified synthetic hydrous silicic acid containing a vinyl group which had been modified by dimethylsilicone oil and vinyl group-containing silane was fixed at 10 wt. parts per 100 wt. parts of the Constituent (I) of a vinyl group-containing dimethylpolysiloxane, and the addition amount of the Constituent (II), i.e., methylhydrogenpolysiloxane was changed.

At this time, the ratio between the total amount (total mole number) of the vinyl groups bonded to the silicon atom contained in the Constituent (I) and the vinyl group of the surface-modified synthetic hydrous silicic acid containing a vinyl group, which had been modified by a silicone oil and a vinyl group-containing silane, and the mole of the hydrogen atom —Si—H) bonded to the Constituent (II), i.e., methylhydrogenepolysiloxane was represented by —Si—H/Vi (Vi denotes a vinyl group).

While the ratio Si—H/Vi was changed, various silicone compositions corresponding to the respective Si—H/Vi values were prepared in the same manner as in Example 6, hardened under heating in a heat press at 150° C. for 10 min., and further subjected to post-curing at 200° C. for 4 hours. The hardness, impact resilience, and toner-releasability of the resultant products were evaluated. The results are shown in FIG. 5.

Figure 5:
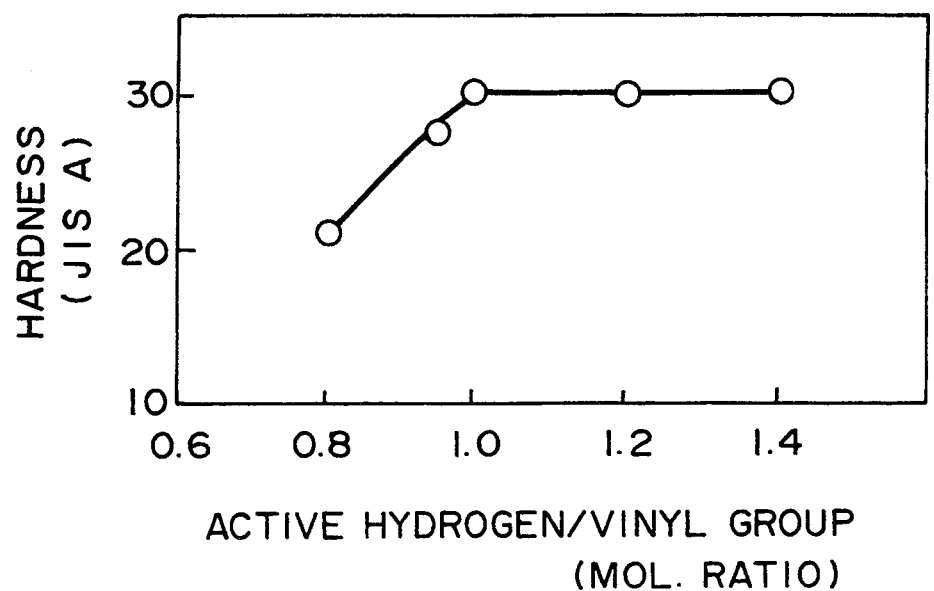
Figure 6:
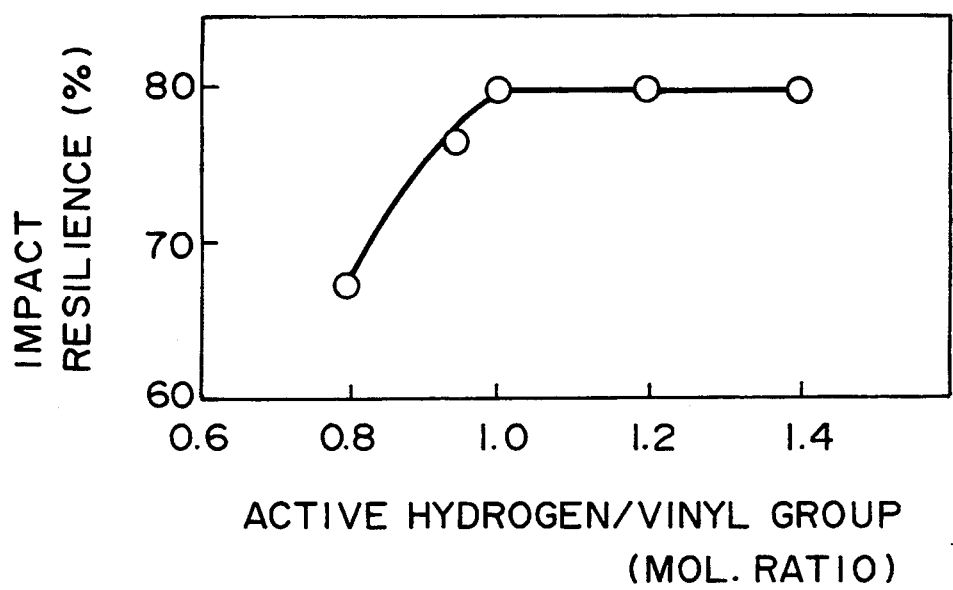

As shown in FIG. 5, when mole of the vinyl group was substantially equal to that of the hydrogen atom bonded to the silicon atom, the hardness, impact resilience and toner-releasability became maximum.

EXAMPLE 10

A fixing roller having an elastic material layer formed of an addition reaction-type dimethylsilicone composition to be used for a heat and pressure fixing device was prepared in the following manner.

First, the surface of an aluminum core bar having an outside diameter of 58.3 mm in the central portion thereof (wall thickness: 6.5 mm, reverse camber degree: 150 microns) was subjected to sand-blasting for the purpose of decreasing, dried and then coated with a siloxane-type primer, and air-dried under heating at 130° C. for 15 min.

Then, the thus prepared core bar was disposed in a cylindrical metal mold which had preliminarily been heated to 150° C.

The addition reaction-type silicone rubber compositions A and B obtained in Example 6 were uniformly mixed at a weight ratio of 100:100, and then degassed to prepare a liquid mixture. The mixture was injected into the cylindrical metal mold and kept at the same temperature (150° C.) for 5 min. thereby to cure the mixture. After the curing, the thus formed fixing roller covered with the silicone rubber was taken out from the metal mold. The silicone rubber covering layer had a thickness of 0.5 mm.

The thus obtained fixing roller was disposed in a heat fixing device as shown in FIG. 4, and a fixing test was conducted while sheets of paper were continuously passed through the fixing device under the following conditions.

FIXING CONDITIONS

Controlled temperature of fixing roller 1 surface: 180°–190° C.

Oil application device 3: A web-type application device including a web (trade name: Normex Paper Web) impregnated with a dimethyl silicone oil (KP96H, mfd. by Shinetsu Kagaku K.K.) having a viscosity of 10,000 cs at 25° C.

Web feed speed: 1 m per 10,000 sheets of paper supply (A-4 size)

Supplied paper: A4 size transfer paper (plain paper) on which an unfixed toner image corresponding to a test pattern was formed.

Paper supply speed: 70 sheets/min.

Nip width (W) between the fixing roller 1 and pressure roller 2: 9–10 mm

EXAMPLE 11

A fixing roller was prepared in the same manner as in Example 10 except that the dimethyl silicone rubber composition obtained in Example 7 was used, and was subjected to a fixing test while sheets of paper were continuously passed through the fixing device in the same manner as in Example 10.

COMPARATIVE EXAMPLE 17

A fixing roller was prepared in the same manner as in Example 10 except that the dimethylsilicone composition obtained in Comparative Example 12 was used, and was subjected to a fixing test while sheets of paper were continuously passed through the fixing device in the same manner as in Example 10.

EXAMPLE 18

A fixing roller was prepared in the same manner as in Example 10 except that the dimethylsilicone composition obtained in Comparative Example 13 was used, and was subjected to a fixing test while sheets of paper were continuously passed through the fixing device in the same manner as in Example 10.

The results obtained in Examples 10 and 11, and Comparative Examples 14–15 are shown in the following Table 4.

TABLE 4

| | Results of paper passage test |
| --- | --- |
| Example 10 | The fixing roller retained good releasability even after 150,000 sheets of paper passage. No jamming trouble occurred. The image quality of the fixed image was also well retained. |
| Example 11 | (The same as described above) |
| Comp. Example 17 | Excessive toner offset phenomenon was observed at the time of about 30,000 sheets of paper passage. Jamming troubles due to paper wrinkle, paper jamming and paper curl frequently occurred. |
| Comp. Example 18 | Excessive toner offset phenomenon was observed at the time of about 10,000 sheets of paper passage. |

TABLE 4-continued

| Results of paper passage test |   |
|---|---|
| Jamming troubles due to paper wrinkle, paper jamming and paper curl frequently occurred. | 5 |

As described hereinabove, the present invention provides an addition reaction-type dimethylsilicone rubber composition which is excellent in mechanical strength and has good releasability.

When the dimethylsilicone rubber composition according to the present invention is used as a coating material of a heat fixing roller, it provides sufficient durability because of its excellent mechanical strength and good releasability. The fixing device including a fixing roller comprising the dimethylsilicone rubber composition according to the present invention as a coating material can solve various problems such as paper curl, paper wrinkle, paper jamming, toner offset and contamination due to toner attachment which can occur in paper conveying or fixing operation, and can retain excellent releasability and fixing ability together with sufficient durability.

In a fixing device, both of the fixing and pressure rollers may use the silicone rubber composition according to the present invention as their coating material, or any one of them may use the silicone rubber composition.

What is claimed is:

1. An elastic revolution body comprising an elastic layer formed from a dimethylsilicone rubber composition; said dimethylsilicone rubber composition being obtained by heating a platinum based catalyst and an addition reaction dimethylsilicone composition comprising a dimethylpolysiloxane containing a reactive vinyl group; a dimethylpolysiloxane containing an active hydrogen atom; and silicic acid fine powder having a BET specific surface area of 40-500 m²/g and surface treated with both 1 to 30 wt. parts of compound (i) and 1 to 30 wt. parts of compound (ii) per 100 wt. parts of said silicic acid fine powder, said compound (i) being selected from the group consisting of a fluoroalkylsilane, an alkylsilane compound, a fluorosilicone oil, a dimethylsilicone oil, hexamethyldisilazane, and a mixture thereof, and said compound (ii) being a silane compound containing an unsaturated group having a reactivity to said dimethylpolysiloxane containing an active hydrogen atom.

2. An elastic revolution body according to claim 1, wherein said silane compound containing an unsaturated group is a vinylsilane compound.

3. An elastic revolution body according to claim 1, wherein said silane compound containing an unsaturated group is a vinylsilane compound selected from the group consisting of vinyltriethoxysilane, dimethylvinylmethoxysilane, dimethylvinyltriethoxysilane, methylvinyldimethoxysilane, methylvinyldiethoxysilane, vinyltrichlorosilane, dimethylvinylchlorosilane, and methylvinyldichlorosilane.

4. An elastic revolution body according to claim 1, wherein said dimethylpolysiloxane containing a reactive vinyl group comprises additional organosiloxane units represented by the formula of

wherein $R_1$ and $R_2$ respectively denote an alkyl group and by the formula of

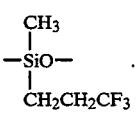

5. An elastic revolution body according to claim 1, wherein said dimethylpolysiloxane containing a reactive vinyl group comprises a dimethylpolysiloxane having vinyl groups at both ends thereof.

6. An elastic revolution body according to claim 1, wherein said dimethylpolysiloxane containing a reactive vinyl group comprises a mixture of a dimethylpolysiloxane having vinyl groups at both ends thereof, and a dimethylpolysiloxane having methyl groups at both ends thereof and having a vinyl group in the side chain thereof.

7. An elastic revolution body according to claim 1, wherein said dimethylpolysiloxane containing an active hydrogen atom contains one or more hydrogen atoms bonded to a silicon atom per one dimethylpolysiloxane molecule, and contains additional organosiloxane units represented by the formula of

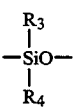

wherein $R_3$ and $R_4$ respectively denote an alkyl group and represented by the formula of

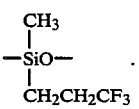

8. An elastic revolution body to claim 1, wherein said dimethylpolysiloxane containing an active hydrogen atom comprises a methylhydrogenpolysiloxane containing one or more hydrogen atoms bonded to a silicon atom per one dimethylpolysiloxane molecule.

9. An elastic revolution body according to claim 1, wherein said silicic acid fine powder has a particle size of 7-100 mμ and a BET specific surface area of 40-500 m²/g.

10. An elastic revolution body according to claim 1, wherein said silicic acid fine powder has a particle size of 5-50 mμ and a BET specific surface area of 70-400 m²/g.

11. An elastic revolution body according to claim 1, wherein said silicic acid fine powder has a particle size of 7-25 mμ and a BET specific surface area of 100-300 m²/g.

12. An elastic revolution body according to claim 1, wherein said silicic acid fine powder has been surface treated with said silane compound (ii) containing an unsaturated group selected from the group consisting of vinyltriethoxysilane, dimethylvinylmethoxysilane, dimethylvinylethoxysilane, methylvinyldimethoxysilane, methylvinyldiethoxysilane, vinyltrichlorosilane, dimethylvinylchlorosilane and methylvinyldichlorosilane; and has further been treated with a surface treating agent as the compound (i) selected from the group consisting of a fluoroalkylsilane represented by $C_nF_{2n+1}CH_2CH_2SiR_m(OR')_{3-m}$, or $C_nF_{2n+1}CH_2CH_2SiR_mCl_{3-m}$ wherein n denotes an integer of 1–8, m denotes 0 or 1, and R and R' respectively denote a methyl or ethyl group; trimethylmethoxysilane, trimethylethoxysilane, dimethyldimethoxysilane, dimethyldiethoxysilane, methyltrimethoxysilane, methyltriethoxysilane, trimethylchlorosilane, dimethyldichlorosilane, methyltrichlorosilane, hexamethyldisilazone, fluorsilicone oil and dimethylsilicone oil.

13. An elastic revolution body according to claim 12, wherein said silicic acid fine powder has been treated with 5–25 wt. parts of the silane compound containing an unsaturated group, and has further been treated with 3–25 wt. parts of the compound (i), with respect to 100 wt. part of the silicic acid.

14. An elastic revolution body according to claim 1, wherein said dimethylsilicone rubber composition has been obtained by using 5–30 wt. parts of the silicic acid fine powder with respect to 100 wt. parts of a mixture of the dimethylpolysiloxane containing a reactive vinyl group, dimethylpolysiloxane containing an active hydrogen atom and platinum-based catalyst.

15. An elastic revolution body according to claim 1, wherein said dimethylsilicone rubber composition has been obtained by using 5–20 wt. parts of the silicic acid fine powder with respect to 100 wt. parts of a mixture of the dimethylpolysiloxane containing a reactive vinyl group, dimethylpolysiloxane containing an active hydrogen atom and platinum based catalyst.

16. An elastic revolution body according to claim 1, wherein said dimethylsilicone rubber composition has been obtained by using 6–15 wt. parts of the silicic acid fine powder with respect to 100 wt. parts of a mixture of the dimethylpolysiloxane containing a reactive vinyl group, dimethylpolysiloxane containing an active hydrogen atom and platinum based catalyst.

17. An elastic revolution body according to claim 1, wherein said dimethylsilicone rubber composition has been obtained by heating the addition reaction dimethylsilicone composition at 100°–180° C. for 0.5–20 min.

18. A fixing device, comprising at least a pair of rollers between which a toner image-supporting material carrying an unfixed toner image is passed under pressure to fix the toner image to the toner image-supporting material; wherein at least one of said pair of rollers comprises an elastic layer formed from a dimethylsilicone rubber composition; said dimethylsilicone rubber composition being obtained by heating a platinum based catalyst and an addition reaction dimethylsilicone composition comprising a dimethylpolysiloxane containing a reactive vinyl group, a dimethylpolysiloxane containing an active hydrogen atom, and silicic acid fine powder having a BET specific surface area of 40–500 m²/g and surface treated with both 1 to 30 wt. parts of compound (i) and 1 to 30 wt. parts of compound (ii) per 100 wt. parts of said silicic acid fine powder, said compound (i) being selected from the group consisting of a fluoroalkylsilane, an alkylsilane compound, a fluorosilicone oil, a dimethylsilicone oil, hexamethyldisilazane, and a mixture thereof, and said compound (ii) being a silane compound containing an unsaturated group having a reactivity to said dimethylpolysiloxane containing an active hydrogen atom.

19. A fixing device according to claim 18, wherein said silane compound containing an unsaturated group is a vinylsilane compound.

20. A fixing device according to claim 18, wherein said silane compound containing an unsaturated group is a vinylsilane compound selected from the group consisting of vinyltriethoxysilane, dimethylvinylmethoxysilane, dimethylvinyltriethoxysilane, methylvinyldimethoxysilane, methylvinyldiethoxysilane, vinyltrichlorosilane, dimethylvinylchlorosilane, and methylvinyldichlorosilane.

21. A fixing device according to claim 18, wherein said dimethylpolysiloxane containing a reactive vinyl group comprises additional organosiloxane units represented by the formula of

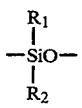

wherein $R_1$ and $R_2$ respectively denote an alkyl group and by the formula of

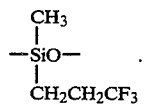

22. A fixing device according to claim 18, wherein said dimethylpolysiloxane containing a reactive vinyl group comprises a dimethylpolysiloxane having vinyl groups at both ends thereof.

23. A fixing device according to claim 18, wherein said dimethylpolysiloxane containing a reactive vinyl group comprises a mixture of a dimethylpolysiloxane having vinyl groups at both ends thereof, and a dimethylpolysiloxane having methyl groups at both ends thereof and having a vinyl group in the side chain thereof.

24. A fixing device according to claim 18, wherein said dimethylpolysiloxane containing an active hydrogen atom contains one or more hydrogen atoms bonded to a silicon atom per one dimethylpolysiloxane molecule, and contains additional organosiloxane units represented by the formula of

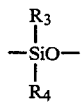

wherein $R_3$ and $R_4$ respectively denote an alkyl group and by the formula of

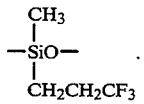

25. A fixing device according to claim 18, wherein said dimethylpolysiloxane containing an active hydrogen atom comprises a methylhydrogenpolysiloxane contains one or more hydrogen atoms bonded to a silicon atom per one dimethylpolysiloxane molecule.

26. A fixing device according to claim 18, wherein said silicic acid fine powder has a particle size of 7-100 m$\mu$ and a BET specific surface area of 40-500 m$^2$/g.

27. A fixing device according to claim 18, wherein said silicic acid fine powder has a particle size of 5-50 m$\mu$ and a BET specific surface area of 70-400 m$^2$/g.

28. A fixing device according to claim 18, wherein said silicic acid fine powder has a particle size of 7-25 m$\mu$ and a BET specific surface area of 100-300 m$^2$/g.

29. A fixing device according to claim 18, wherein said silicic acid fine powder has been surface-treated with the silane compound (ii) containing an unsaturated group selected from the group consisting of vinyltriethoxysilane, dimethylvinylmethoxysilane, dimethylvinylethoxysilane, methylvinyldimethoxysilane, methylvinyldiethoxysilane, vinyltrichlorosilane, dimethylvinylchlorosilane and methylvinyldichlorosilane; and has further been treated with a surface-treating agent as the compound (i) selected from the group consisting of a fluoroalkylsilane represented by $C_nF_{2n+1}CH_2CH_2SiR_m(OR')_{3-m}$ or $C_nF_{2n+1}CH_2CH_2SiR_mCl_{3-m}$ wherein n denotes an integer of 1-8, m denotes 0 or 1, and R and R' respectively denote a methyl or ethyl group; trimethylmethoxysilane, trimethylethoxysilane, dimethyldimethoxysilane, dimethyldiethoxysilane, methyltrimethoxysilane, methyltriethoxysilane, trimethylchlorosilane, dimethyldichlorosilane, methyltrichlorosilane, hexamethyldisilazone, fluorosilicone oil and dimethylsilicone oil.

30. A fixing device according to claim 29, wherein said silicic acid fine powder has been treated with 5-25 wt. parts of the silane compound containing an unsaturated group, and has further been treated with 3-25 wt. parts of the compound (i), with respect to 100 wt. part of the silicic acid fine powder.

31. A fixing device according to claim 18, wherein said dimethylsilicone rubber composition has been obtained by using 5-30 wt. parts of the silicic acid fine powder with respect to 100 wt. parts of a mixture of the dimethylpolysiloxane containing a reactive vinyl group, dimethylpolysiloxane containing an active hydrogen atom and platinum based catalyst.

32. A fixing device according to claim 18, wherein said dimethylsilicone rubber composition has been obtained by using 5-20 wt. parts of the silicic acid fine powder with respect to 100 wt. parts of a mixture of the dimethylpolysiloxane containing a reactive vinyl group, dimethylpolysiloxane containing an active hydrogen atom and platinum based catalyst.

33. A fixing device according to claim 18, wherein said dimethylsilicone rubber composition has been obtained by using 6-15 wt. parts of the silicic acid fine powder with respect to 100 wt. parts of a mixture of the dimethylpolysiloxane containing a reactive vinyl group, dimethylpolysiloxane containing an active hydrogen atom and platinum based catalyst.

34. A fixing device according to claim 18, wherein said dimethylsilicone rubber composition has been obtained by heating the addition reaction dimethylsilicone composition at 100°-180° C. for 0.5-20 min.

* * * * *

UNITED STATES PATENT AND TRADEMARK OFFICE
CERTIFICATE OF CORRECTION

PATENT NO. : 5,354,612

DATED : October 11, 1994

INVENTOR(S) : TOSHIYUKI MIYABAYASHI

Page 1 of 4

It is certified that error appears in the above-identified patent and that said Letters Patent is hereby corrected as shown below:

On the title page, item

[56] References Cited

Attorney, Agent, or Firm, "Fitzpatrick, Cella Harper & Scinto" should read --Fitzpatrick, Cella, Harper & Scinto--.

COLUMN 2

Line 63, "in" should be deleted.

COLUMN 4

Line 38, "prises" should read --prise--; and

Line 59, "Si — $CH_3$; or" should read
$$\begin{array}{c} CH_3 \\ | \\ Si-CH_3; \text{ or} \\ | \\ CH_3 \end{array}$$

COLUMN 5

Line 48, "polysiloxane," should read --polysiloxane--.

COLUMN 7

Line 67, "preferably" should read --preferably be--.

COLUMN 11

Line 20, chiain" should read --chain--.

UNITED STATES PATENT AND TRADEMARK OFFICE
CERTIFICATE OF CORRECTION

PATENT NO. : 5,354,612
DATED : October 11, 1994
INVENTOR(S) : TOSHIYUKI MIYABAYASHI It is certified that error appears in the above-identified patent and that said Letters Patent is hereby corrected as shown below:

COLUMN 13

Line 35, "silicon" should read --silicone--.

COLUMN 16

Line 24, "platinum" should read --Platinum--; and

Line 64, "treated" should read --was treated--.

COLUMN 17

Line 14, "platinum" should read --Platinum--.

COLUMN 23

Line 47, "quarts" should read --quartz--;

Line 48, "parts" should read --part--; and

Line 56, "parts" should read --part--.

COLUMN 26

Line 11, "constituent (IV)" should read --Constituent (IV)--.

COLUMN 27

Line 27, "methylhydrogenepolysiloxane" should read --methylhydrogenpolysiloxane--; and Line 51, "decreasing," should read --degreasing--.

UNITED STATES PATENT AND TRADEMARK OFFICE
CERTIFICATE OF CORRECTION

PATENT NO. : 5,354,612

DATED : October 11, 1994

INVENTOR(S) : TOSHIYUKI MIYABAYASHI

It is certified that error appears in the above-identified patent and that said Letters Patent is hereby corrected as shown below:

COLUMN 30

Line 39, "represented" should be deleted; and
Line 46, "body" should read --body according--.

COLUMN 31

Line 14, "hexamethyldisilazone," should read --hexamethyldisilazane,--;

Line 15, "fluorsilicone" should read --fluorosilicone--;

Line 35, "platinum based" should read --platinum-based--;

Line 42, "platinum based" should read --platinum-based--; and

Line 55, "platinum based" should read --platinum-based--.

COLUMN 33

Line 28, "hexamethyldisilazone," should read --hexamethyldisilazane,--.

COLUMN 34

Line 3, "part" should read --parts--;

Line 11, "platinum based" should read --platinum-based--;

UNITED STATES PATENT AND TRADEMARK OFFICE
CERTIFICATE OF CORRECTION

PATENT NO. : 5,354,612
DATED : October 11, 1994
INVENTOR(S) : TOSHIYUKI MIYABAYASHI It is certified that error appears in the above-identified patent and that said Letters Patent is hereby corrected as shown below:

COLUMN 34, Cont'd.

Line 18, "platinum based" should read --platinum-based--; and

Line 25, "platinum based" should read --platinum-based--.

Signed and Sealed this

Seventeenth Day of October, 1995

BRUCE LEHMAN

Attesting Officer   Commissioner of Patents and Trademarks